(12) United States Patent
Jones

(10) Patent No.: US 7,111,407 B2
(45) Date of Patent: Sep. 26, 2006

(54) VERTICAL SHAFT ALIGNMENT TOOL

(75) Inventor: Jeffery Carl Jones, Dunlap, TN (US)

(73) Assignee: Tennessee Valley Authority, Knoxville, TN (US)

( * ) Notice: Subject to any disclaimer, the term of this patent is extended or adjusted under 35 U.S.C. 154(b) by 0 days.

(21) Appl. No.: 10/998,627

(22) Filed: Nov. 30, 2004

(65) Prior Publication Data

US 2006/0112577 A1    Jun. 1, 2006

(51) Int. Cl.
*G01C 9/06* (2006.01)

(52) U.S. Cl. .................. 33/366.12; 33/529; 33/412

(58) Field of Classification Search .......... 33/366.12, 33/366.11, 366.13, 370, 412, 529
See application file for complete search history.

(56) References Cited

U.S. PATENT DOCUMENTS

| | | | | |
|---|---|---|---|---|
| 1,305,935 A | * | 6/1919 | Rieker | 33/370 |
| 5,063,679 A | * | 11/1991 | Schwandt | 33/370 |
| 5,371,953 A | * | 12/1994 | Nower et al. | 33/412 |
| 5,488,777 A | * | 2/1996 | Erdesky | 33/370 |
| 5,594,669 A | * | 1/1997 | Heger | 33/366.11 |
| 6,418,774 B1 | * | 7/2002 | Brog.ang.rdh et al. | 73/1.75 |
| 6,532,675 B1 | * | 3/2003 | Letourneau | 33/529 |
| 6,763,597 B1 | * | 7/2004 | Lysen | 33/412 |
| 6,948,722 B1 | * | 9/2005 | Sproatt et al. | 280/6.153 |
| 6,966,120 B1 | * | 11/2005 | Lysen | 33/412 |
| 2003/0066198 A1 | * | 4/2003 | Turner | 33/370 |

* cited by examiner

*Primary Examiner*—Christopher W. Fulton
(74) *Attorney, Agent, or Firm*—Sughrue Mion, PLLC

(57) ABSTRACT

An apparatus and a method for aligning a vertical shaft or multiple axially coupled vertical shafts in a hydroelectric turbine generator or a similar vertical-shaft system, and for providing precise plumb inclination alignment of a vertical rotating shaft. Precision inclinometers attached to the vertical shaft measure plumb inclination. Proximity probe displacement devices mounted externally of the vertical shaft measure radial movement, throw, or run out at various shaft elevations as the shaft is rotated relative to a fixed point. Data acquisition devices and communication devices accumulate and transmit alignment data to a micro-computer which receives and processes such data. Methods of defining shaft plumb inclination in a static single rotational position and defining plumb inclination of the virtual centerline of a shaft's rotational throw position. A method of swinging, tilting, or adjusting a vertical shaft to a corrected or different plumb position relative to the earth's gravity.

27 Claims, 16 Drawing Sheets

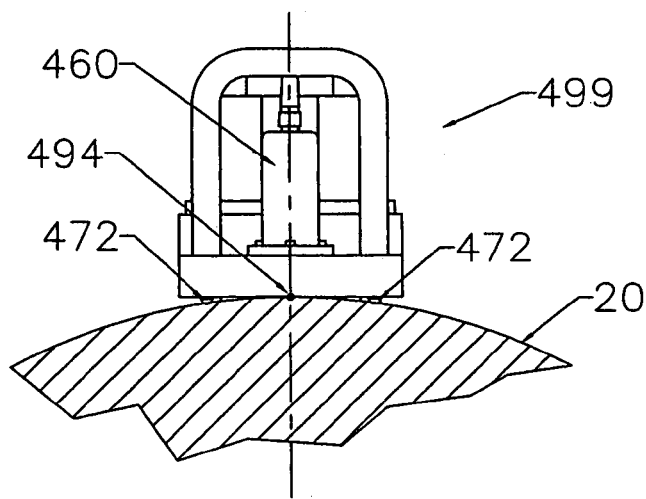
FIG. 6A
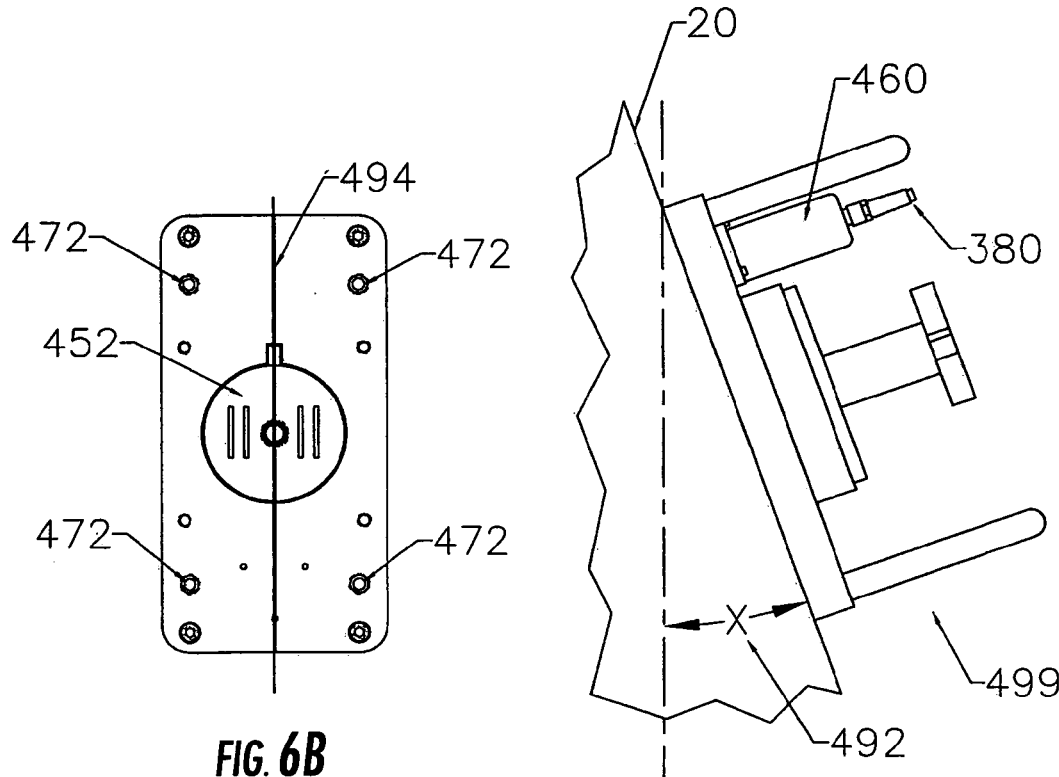
FIG. 6B
FIG. 6C

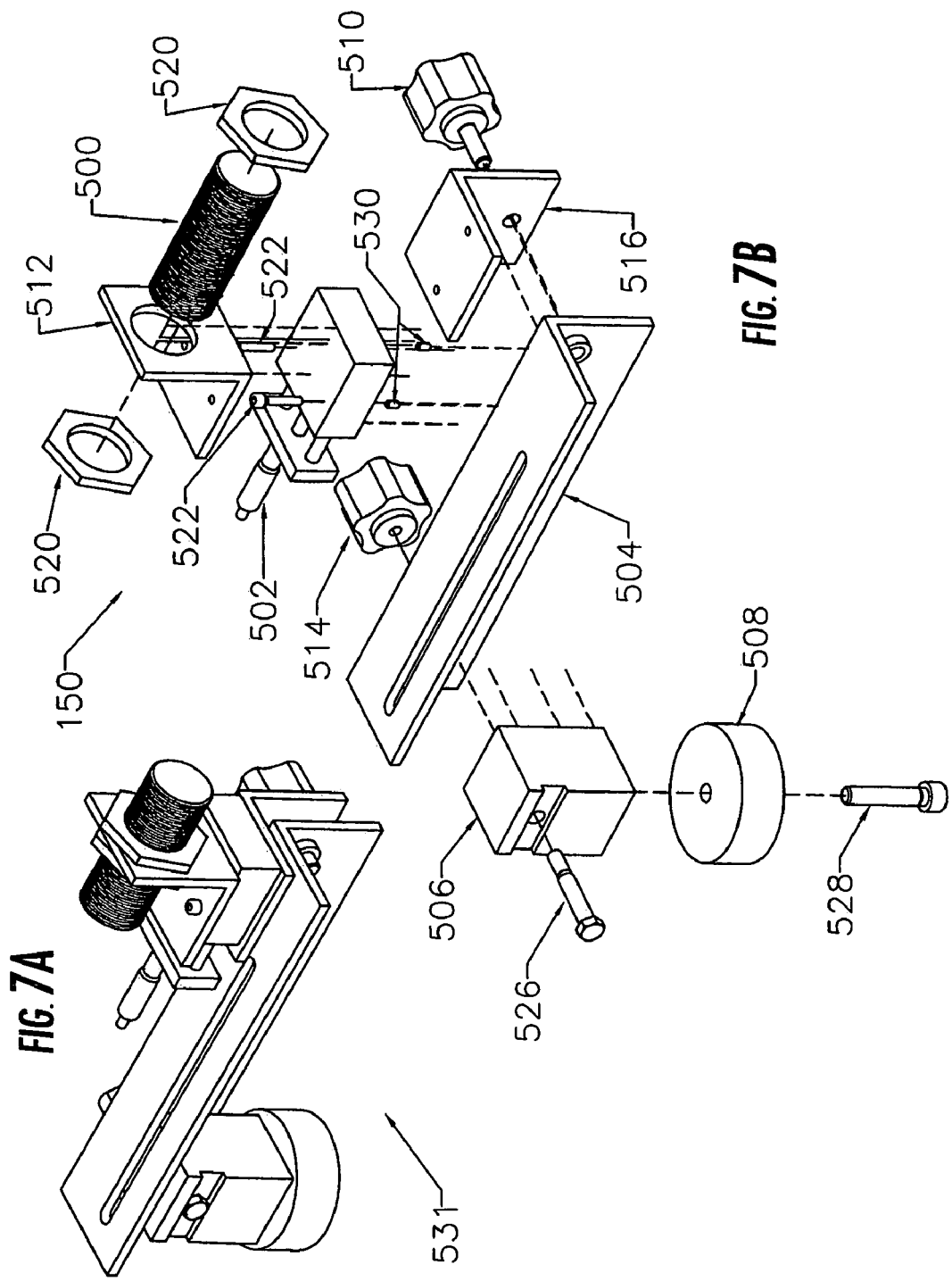

VERTICAL SHAFT ALIGNMENT TOOL

FIELD OF INVENTION

The present invention relates generally to the alignment of vertical shafts and, more particularly, to aligning a vertical shaft to the plumb position, and to measurement of the built in throw (run out) of a shaft as the shaft is rotated. The present invention also relates to a method and an apparatus for aligning a vertical shaft, or a plurality of axially coupled vertical shafts, of a hydroelectric turbine generator or of a similar vertical-shaft system.

Vertical shafts (particularly hydroelectric generator/turbine shafts) have been aligned using various methods for over 100 years. The most common method (industry standard) is called the 4 plumb wire method. To check the plumb or verticality of a shaft, 4 music wires (or piano wires) are connected to a bracket at an upper elevation and at 4 equally spaced locations, 90 degrees apart, around the shaft. These wires are connected at the bottom to large plumb bobs (usually fifty pound weights) which are immersed in a bath of high viscosity oil or other fluid for damping. Readings are taken of distances from the wires to the shaft at multiple elevations with electric micrometers. The micrometers give an audible click in the earphones of an operator when the micrometer makes contact between the wire and shaft. The electric micrometer basically acts as a switch to allow current to flow through the operator's earphones when the circuit is completed through the wire and shaft which are electrically connected. By measuring these distances from the wires to the shaft at a top and bottom elevations on the shaft, the amount of deviation from plumb can be determined for the shaft. By measuring these distances from the wires at elevations on each side of a shaft system coupling, kink (deviation from parallel centerlines; also called "dog-leg") and offset (non-concentric centerlines) can be determined. By measuring the plumb of the shaft at various rotational positions (i.e. 0 deg, 90 deg, 180 deg, and 270 deg), the shaft throw (run out) can be determined.

The alignment of vertical shafts in hydroelectric generating units and similar rotating shafts in other machinery, such as vertical pumps, usually requires equalizing the thrust bearing shoe or thrust member loads; plumbing the shafts (plumb to gravity); and plumbing the centerline of shaft throw circles (run out). Many of the tools and methods used to accomplish such alignments date back as long as 100 years. These dated methods and tools tend to be slow and awkward to use. The conventional 4 plumb wire method is a workable method; however, it is very time-consuming, both in setup and in the execution of data gathering. It also requires a lot of user training because of its abstract methods and calculations.

The recognition of these deficiencies, along with the advent of more modern sensor technologies, led to the conception of this invention.

SUMMARY OF THE INVENTION

A purpose of this invention is to align a vertical shaft's axis or center of rotation with the earth's gravitational pull (i.e., to plumb the shaft) and to measure the shaft's throw (shaft run out) as the shaft is rotated. The invention was designed primarily to align the vertical generator/turbine shafts in hydroelectric units; however, it is fully capable of aligning vertical shafts in pumps and similar equipment. It is important to align a vertical shaft with the direction of to the earth's gravity in order to reduce and/or equalize the bearing load and thus, to reduce the wear on the equipment's bearings. Very close tolerances are strived for based on industry standards. A condition of excessive throw (shaft run out) can lead to reduced bearing life; therefore, it is advantageous to know this condition prior to returning the equipment to service so that corrective action can be taken.

The present vertical shaft alignment tool invention is the result of a determination to invent a quicker and more user-friendly method and tool for aligning vertical shafts. For any vertical shaft alignment tool and method to successfully take the place of the standard 4 plumb wire method, these would have to be performed:

1. Initially measure plumb at one position without rotating the shaft.
2. Measure the plumb of the center of rotation of the shaft as it is rotated.
3. Measure throw (run out) of the shaft as it is turned.
4. Measure the shaft kink and coupling offset.
5. Provide a method of adjusting the thrust bearing shoes to tilt the shaft toward the plumb position without changing the thrust loading on the shoes.
6. Provide easier and faster use.

The vertical shaft alignment tool meets all of these requirements, using supportive technologies that have only recently become available, such as electronic digital inclinometers, proximity sensors and micro computers. An inclinometer is a device that measures inclination or deviation from plumb; whereas, a proximity sensor is a device which measures distances from itself to an object, such as a shaft. Digital inclinometers, such as the Wyler AG Zerotronic inclinometer, used in the vertical shaft alignment tool invention, provide more accurate plumb measurements than the 4 plumb wire method and are less subject to vibration and error. These advanced inclinometers have been available for only the past couple of years. Therefore, the vertical shaft alignment tool is based on the very latest technology.

Plumbing of vertical shafts was made possible through the vertical shaft alignment tool due to this tool's unique design of mounting the inclinometers on the shaft, and the methodology of performing the calculations in determining deviation from plumb. Shaft rotational throw (run out) is obtained through the proximity sensor measurements from a stationary point relative to the shaft movement. The vertical shaft alignment tool's unique methodology performs these calculations while factoring out any horizontal movement or skate which can occur due to movement of the shaft in the clearances of the radial guide bearings as the shaft is rotated. The vertical shaft alignment tool is able to use any type of proximity sensor, such as, eddy current (currently used), capacitive, inductive, laser, or mechanical (like common mechanical dial indicators).

The advantages of this vertical shaft alignment tool are:

The system allows for faster alignments, setup and execution;

There are no plumb wires to install, which is time consuming and the wires are prone to kinking, leading to errors;

Removes potential for oil spills and environmental problems since the required wires and oil dampers are not used;

Allows for instantaneous viewing of alignment changes from the inclinometers and proximity sensors, unlike the 4 plumb wire method which requires the wire distances to be measured again; and Measurements are taken as the shaft is rotated, directly giving the plumb of the center of rotation, unlike the 4 plumb wire method which requires graphing of the results.

It is therefore an object of this invention to provide an alignment system that provides precise plumb inclination alignment of a vertical shaft.

It is another object of the invention to plumb a shaft in a static single position by taking readings from inclinometers, attached to the shaft surfaces, without rotating the shaft.

It is another object of the invention to plumb the virtual centerline of a shaft's rotational throw circle (run out), with inclinometers attached to the shaft surface, by rotating the shaft.

It is another object of the invention to measure the diameter of the shaft's throw circle (run out) by use of proximity probes or other displacement measuring devices, as the shaft is rotated.

It is another object of the invention to measure a shaft's straightness or kink and centerline deviations or coupling offset by use of proximity probes or other displacement measuring devices, during rotation of the shaft.

It is another object of the invention to measure a shaft's straightness or kink by use of inclinometers attached to the shaft surface, without rotating the shaft.

It is another object of this invention is to provide an alignment system that is simple to use, is portable, and provides an accurate vertical shaft alignment according to accepted industry standards.

In general, the invention provides an apparatus and a method for aligning a vertical shaft or multiple axially coupled vertical shafts in a hydroelectric turbine generator or similar vertical shafting system. It also provides a precise plumb inclination alignment of a vertical rotating shaft, as defined in a static single position, and plumb of the virtual centerline of the shaft's rotational throw position.

More particularly, the present invention provides an improved apparatus and method for aligning vertical shafts to the plumb position, relative to the prior art, such as the 4 plumb wire apparatus and method. The improved apparatus comprises precision inclinometers attached to the vertical shaft to measure the plumb inclination; proximity probe devices mounted externally of the vertical shaft to measure radial movement or throw (run out) at various shaft elevations as the shaft is rotated; data acquisition devices and communication devices used to accumulate and transmit alignment data; and a micro-computer used to receive and process such data. The improved alignment methods consist of a method of placing the inclinometers on the vertical shaft to measure plumb inclination at one static position; a method of placing inclinometers on vertical shaft and rotating the shaft to measure the plumb inclination of the shaft's centerline of throw circle (run out); a method of measuring the diameter of the shaft's throw circle (run out) as the shaft is turned; a method of measuring the shaft coupling kink or straightness with inclinometers; a method of measuring shaft coupling kink (straightness) and coupling offset with proximity probes; and a method of correcting a shaft's deviation from plumb by adjusting the thrust bearing shoe elevations or thrust bearing support structure.

Other objects, advantages and features of the present invention will be apparent to those skilled in the art from the following detailed description when read in conjunction with the drawings and appended claims.

BRIEF DESCRIPTION OF THE DRAWINGS

A complete understanding of the present invention may be obtained by reference to the accompanying drawings, when considered in conjunction with the subsequent, detailed description, in which:

FIGS. 6(a), 6(b) and 6(c) are perspective views of an inclinometer arrangement.

FIG. 7(a) is an assembled view of a proximity probe assembly.

FIG. 7(b) is an exploded view of a proximity probe assembly.

For purposes of clarity and brevity, like elements and components will bear the same designations and numbering throughout the FIGURES.

DESCRIPTION OF THE PREFERRED EMBODIMENT

Figure 1A:
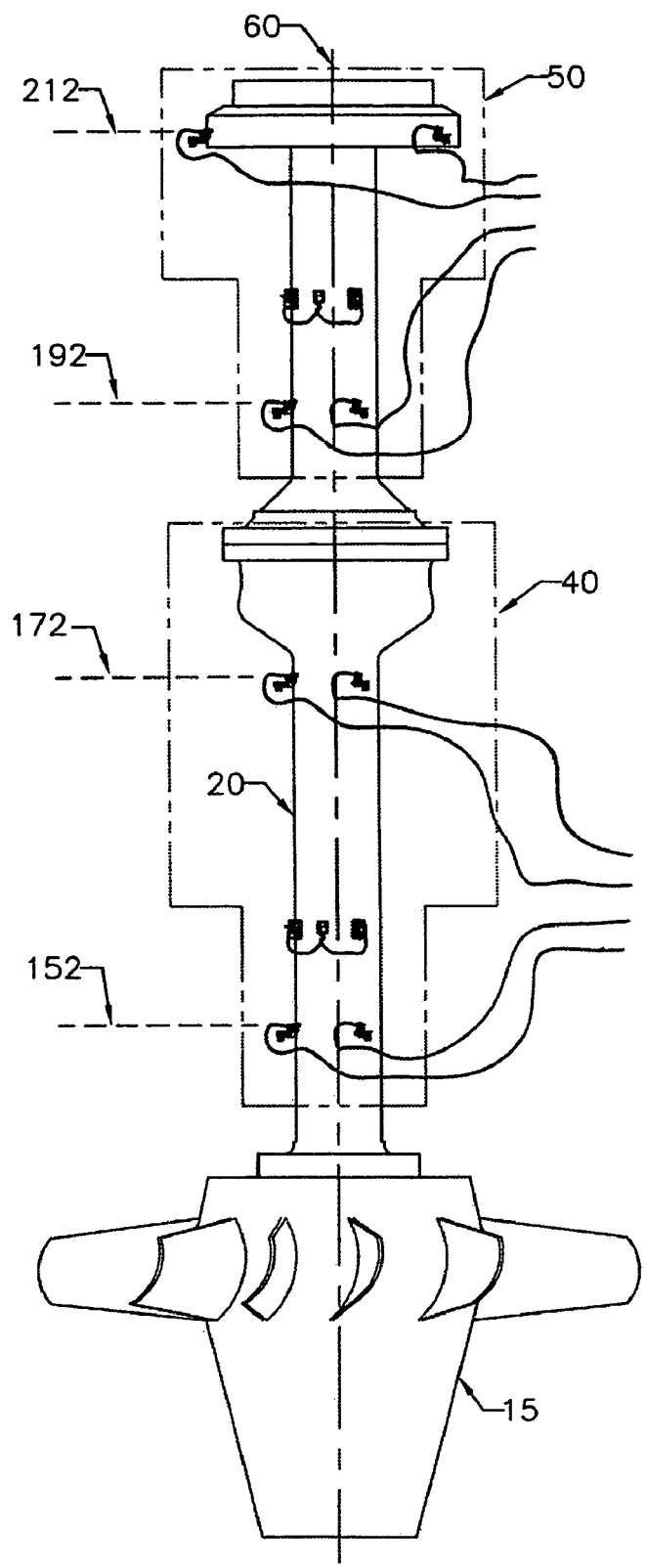
FIGS. 1(a) and (b) are perspective views of the vertical shaft alignment equipment.
Figure 1B:
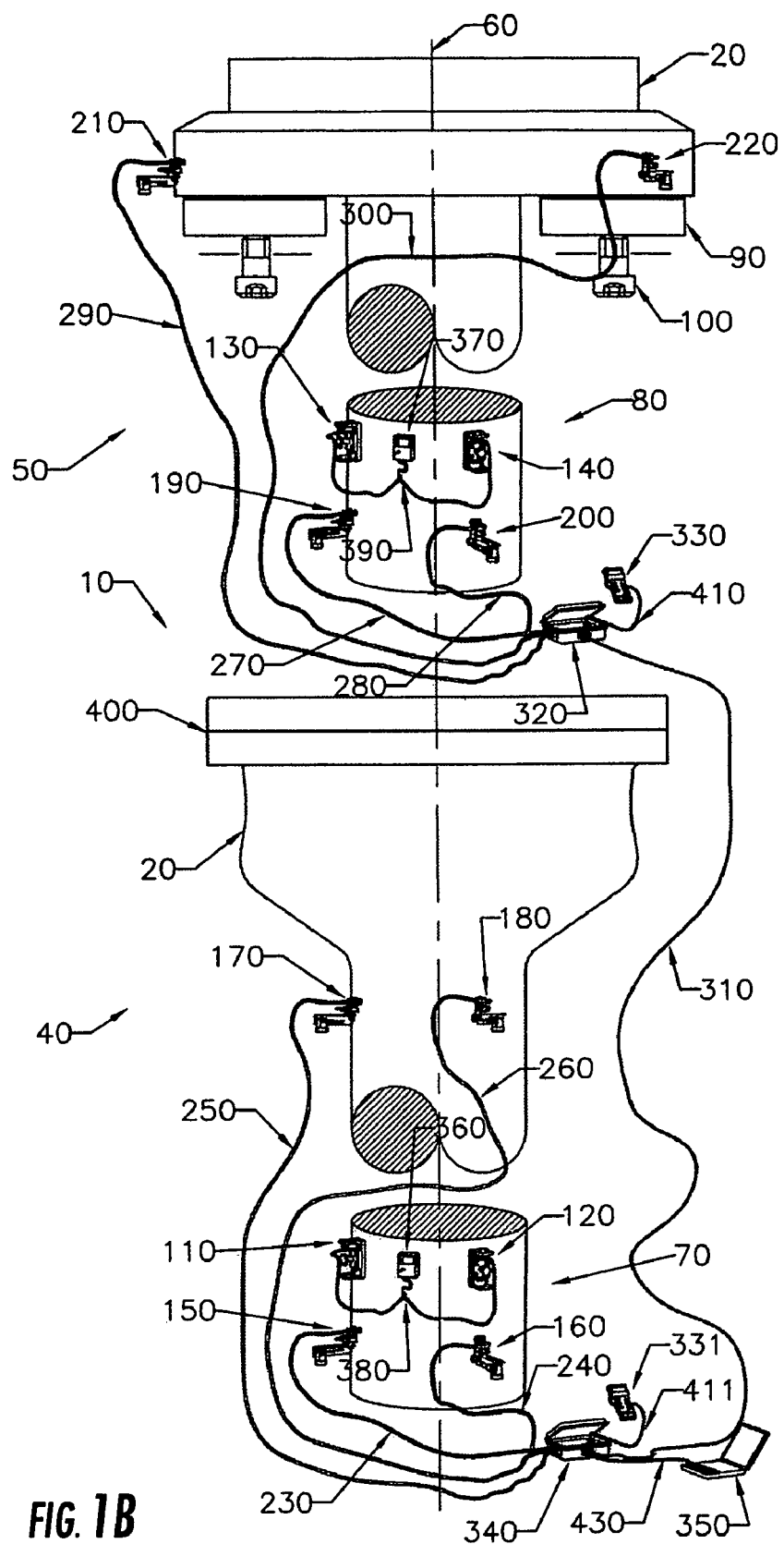

FIGS. 1(a) and 1(b) are overall perspective views of the vertical shaft alignment tool 10 as assembled on a vertical rotating shaft of a shaft 20, which is comprised of two shaft sections (lower and upper) 40, 50 coupled together. A turbine runner 15 (FIG. 1(a)) is attached at the end of the lower portion of the shaft 20. Although a turbine shafting system is shown, the vertical shaft alignment tool 10 will function with any vertical shaft system, such as, vertical pumps and others. FIG. 1(b) shows the vertical shaft 20 in two expanded sections, the lower shaft section 40 and the upper shaft section 50, with the vertical shaft alignment tool 10 components attached. The normal shaft centerline 60 is shown passing through the center of the shaft 20. The shaft's vertical thrust load is supported on the thrust bearing assembly 90 and is transmitted to the stationary surrounding structure (not shown) by way of the thrust adjustment screw assembly 100.

The sensors which measure the plumb inclination of the shaft 20 are shown in FIG. 1(b). The two inclinometer assemblies 499 (FIGS. 6(a), 6(b), and 6(c)), attached to the lower portion of the shaft 20 and positioned at 90 degrees apart are referred to as the lower x-axis inclinometer 110 and the lower y-axis inclinometer 120. The two inclinometer assemblies 499 sensing the plumb inclination of the upper portion of the shaft are referred to as the upper x-axis inclinometer 130 and the upper y-axis inclinometer 140.

Plumb inclination is defined as the deviation of the shaft's vertical rotational axis from the virtual perpendicular line passing through the earth's surface to its center as defined by the earth's gravitational field.

The sensors which measure the radial position of the shaft, relative to the stationary support structure, are shown in FIG. 1(a) at four different vertical elevations which will be referred to, from top to bottom, as elevation 1 (at level 212), elevation 2 (at level 192), elevation 3 (at level 172), and elevation 4 (at level 152). At each elevation two proximity probe assemblies are positioned 90 degrees apart and measure the gap between the end of the probe sensor and the surface of the shaft. The proximity probe assemblies 531 (FIGS. 7(a) and 7(b)) at elevation 1 are referred to as elevation 1 x-axis proximity probe 210 and elevation 1 y-axis proximity probe 220. The proximity probe assemblies 531 at elevation 2 are referred to as elevation 2 x-axis proximity probe 190 and elevation 2 y-axis proximity probe 200. The proximity probe assemblies 531 at elevation 3 are referred to as elevation 3 x-axis proximity probe 170 and elevation 3 y-axis proximity probe 180. The proximity probe assemblies 531 at elevation 4 are referred to as elevation 4 x-axis proximity probe 150 and elevation 4 y-axis proximity probe 160.

The measurement readings from the proximity probe assemblies 531 from elevation 1 (212) and elevation 2 (192) are read by analog-to-digital data acquisition equipment shown as the upper data acquisition box 320 (see FIGS. 1(a) and (2)). This data acquisition box 320 includes a power supply for powering the proximity probes and an analog-to-digital converter for converting the analog signals to digital signals that may serve as inputs to the micro computer 350. The analog-to-digital converter is similar to that made by Advantech Corporation ADAM Module series or equal. Proximity probe cable 290 and proximity probe cable 300 provide power and transfer signals between the proximity probe assemblies at elevation 1 and the upper data acquisition box 320. Proximity probe cable 270 and proximity probe cable 280 provide power and transfer signals between the proximity probe assemblies, at elevation 2 (192), and the upper data acquisition box 320. The analog-to-digital converter transmits its data to the micro computer 350 by way of a standard addressable RS-485 network; however, any multi-node networking technology, such as Ethernet or others, can be used.

Figure 3:
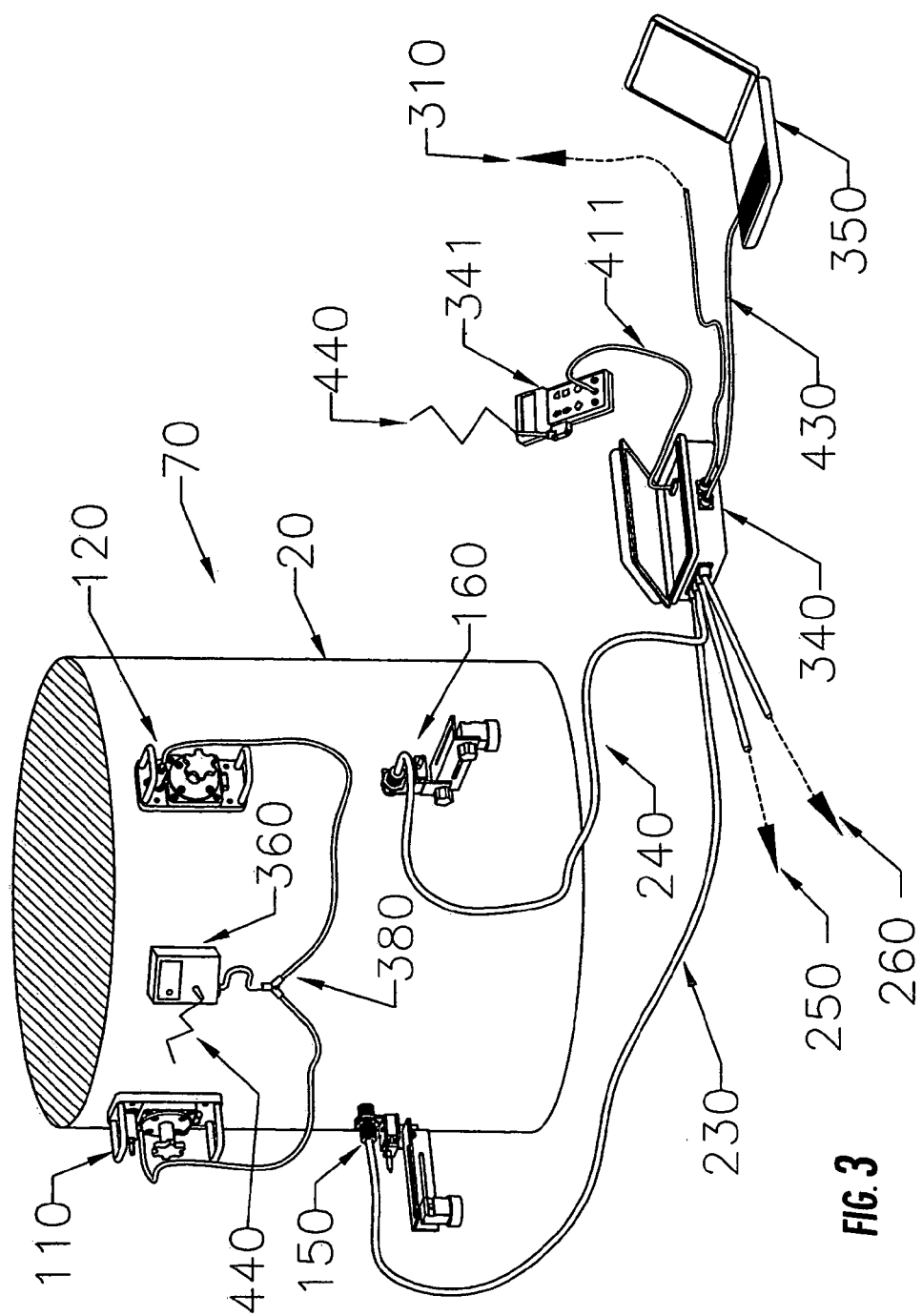
FIG. 3 is a perspective view of a lower alignment equipment assembly on a shaft.

The measurement readings from the proximity probe assemblies from elevation 3 (172) and elevation 4 (152) are read by analog-to-digital data acquisition equipment shown as the lower data acquisition box 340 in FIGS. 1(b) and 3. This data acquisition box 340 includes a power supply for powering the proximity probes and an analog-to-digital converter for converting the analog signals to digital signals that may serve as inputs to the micro computer 350. The analog-to-digital converter is similar to that made by Advantech Corporation Adam Module series or equal. Proximity probe cable 250 and proximity probe cable 260 provide power and transfer signals between the proximity probe assemblies 531 at elevation 3 (172) and the lower data acquisition box 340. Proximity probe cable 230 and proximity probe cable 240 provide power and transfer signals between the proximity probe assemblies 531 at elevation 4 (152) and lower data acquisition box 340. The analog-to-digital converter transmits its data to the micro computer 350 by way of a standard addressable RS-485 network; however, any multi-node networking technology, such as Ethernet or others, can be used.

Measurement of the plumb inclination of the upper portion 50 of the shaft 20 is read from the upper x-axis inclinometer 130 and upper y-axis inclinometer 140, and is transmitted by way of upper radio box y-cable 390 to the upper radio transmitter 370 (FIG. 2), such as a Radio Box manufactured by Wyler AG Corporation. The upper radio transmitter 370 transmits the plumb inclination data wirelessly to the upper inclinometer receiver and display 330, such as a Levelmeter 2000 manufactured by Wyler AG Corporation. The upper inclinometer receiver and display 330, displays the inclinometer data locally and transmits the data via communications cable 410 using the RS-232 standard to the upper data acquisition box 320. The upper data acquisition box 320 contains a converter, such as that manufactured by Advantech Corporation ADAM module series or equal, which converts the RS-232 signal to an addressable RS-485 signal that can be transmitted on the RS-485 network to the micro computer 350.

Measurement of the plumb inclination of the lower portion 40 of the shaft 20 is read from the lower x-axis inclinometer 110 and lower y-axis inclinometer 120 and transmitted by way of lower radio box y cable 380 to the lower radio transmitter 360 (FIG. 3), such as a Radio Box manufactured by Wyler AG Corporation. The lower radio transmitter 360 transmits the plumb inclination data wirelessly to the lower inclinometer receiver and display 331, such as a Levelmeter 2000 as manufactured by Wyler AG Corporation. The lower inclinometer receiver and display 331 displays the inclinometer data locally and transmits the data via communications cable 411 using the RS-232 standard to the lower data acquisition box 340. The lower data acquisition box 340 contains a converter, such as that manufactured by Advantech Corporation ADAM module series or equal, which converts the RS-232 signal to an addressable RS-485 signal that can be transmitted on the RS-485 network to the micro computer 350.

The wireless transmission of inclinometer data to the micro computer is advantageous to avoid any problems associated with handling cabling as the shaft is rotated.

The upper data acquisition box 320 is connected to the lower data acquisition box 340 and the micro computer 350 via network cable 310 and data acquisition transmit cable 430 on the RS-485 network. These cables can be replaced with wireless technologies, such as those manufactured by Advantech Corporation, ADAM module series, wireless Ethernet, or equal.

Figure 2:
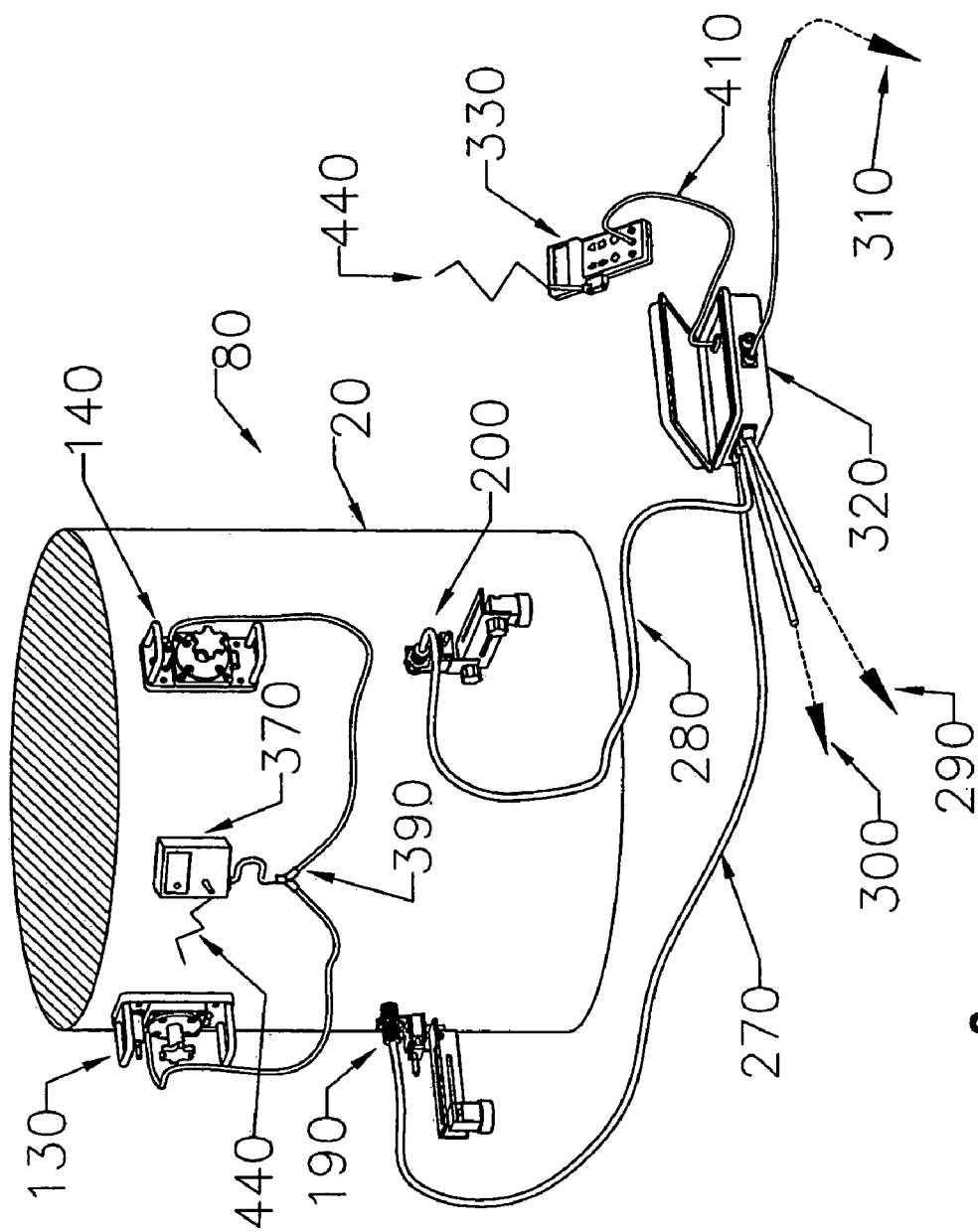
FIG. 2 is a perspective view of an upper alignment equipment assembly on a shaft.

FIG. 2 is an enlarged perspective view showing the upper equipment assembly 80 taken from a portion of the overall assembly of the vertical shaft alignment tool 10 shown in FIG. 1(b). This enlarged view shows the upper x-axis inclinometer 130 and upper y-axis inclinometer 140 attached to the shaft 20 with their outputs connected to upper radio box y cable 390 which is connected to the upper radio transmitter 370. The upper radio transmitter 370 communicates with the upper inclinometer receiver and display 330 via the radio communications signal 440. The upper inclinometer receiver and display 330 displays the inclinometer data locally and transmits the data via communications cable 410 using the RS-232 standard to the upper data acquisition box 320. The upper data acquisition box 320 contains a converter, such as that manufactured by Advantech Corporation ADAM module series or equal, which converts the RS-232 signal to an addressable RS-485 signal that can be transmitted on the RS-485 network to the micro computer 350. FIG. 2 shows elevation 2 x-axis proximity probe 190 and elevation 2 y-axis proximity probe 200. These proximity probes are connected to the upper data acquisition box 320 via proximity probe cable 270 and proximity probe cable 280. The elevation 1 x-axis proximity probe 210 and the elevation 1 y-axis proximity probe 220 (shown in FIG. 1(b)) are connected to the upper data acquisition box 320 via proximity probe cable 290 and proximity cable 300. The upper data acquisition box 320 is connected to the RS-485 network via network cable 310.

FIG. 3 is a perspective view showing the lower equipment assembly 70 taken from a portion of the overall assembly of the vertical shaft alignment tool 10 shown in FIG. 1(b). This enlarged view shows the lower x-axis inclinometer 110 and lower y-axis inclinometer 120 attached to the lower section 40 of the shaft 20 with their outputs connected to lower radio box y cable 380 which is connected to the lower radio transmitter 360. The lower radio transmitter 360 communicates with the lower inclinometer receiver and display 341 via the radio communications signal 440. The lower inclinometer receiver and display 341 displays the inclinometer data locally and transmits the data via communications cable 411 using the RS-232 standard to the lower data acquisition box 340. The lower data acquisition box 340 contains a converter, such as that manufactured by Advantech Corporation ADAM module series or equal, which converts the RS-232 signal to an addressable RS-485 signal that can be transmitted on the RS-485 network to the micro computer 350.

FIG. 3 also shows elevation 4 x-axis proximity probe 150 and elevation 4 y-axis proximity probe 160. These proximity probes are connected to the lower data acquisition box 340 via proximity probe cable 230 and proximity probe cable 240. The elevation 3 x-axis proximity probe 170 and the elevation 3 y-axis proximity probe 180 (shown in FIG. 1(b)) are connected to the lower data acquisition box via proximity probe cable 250 and proximity cable 260. The lower data acquisition box 340 is connected to the RS-485 network via network cable 310 and connected to the micro computer 350 via communications cable 430.

Figures 4A, 4B:
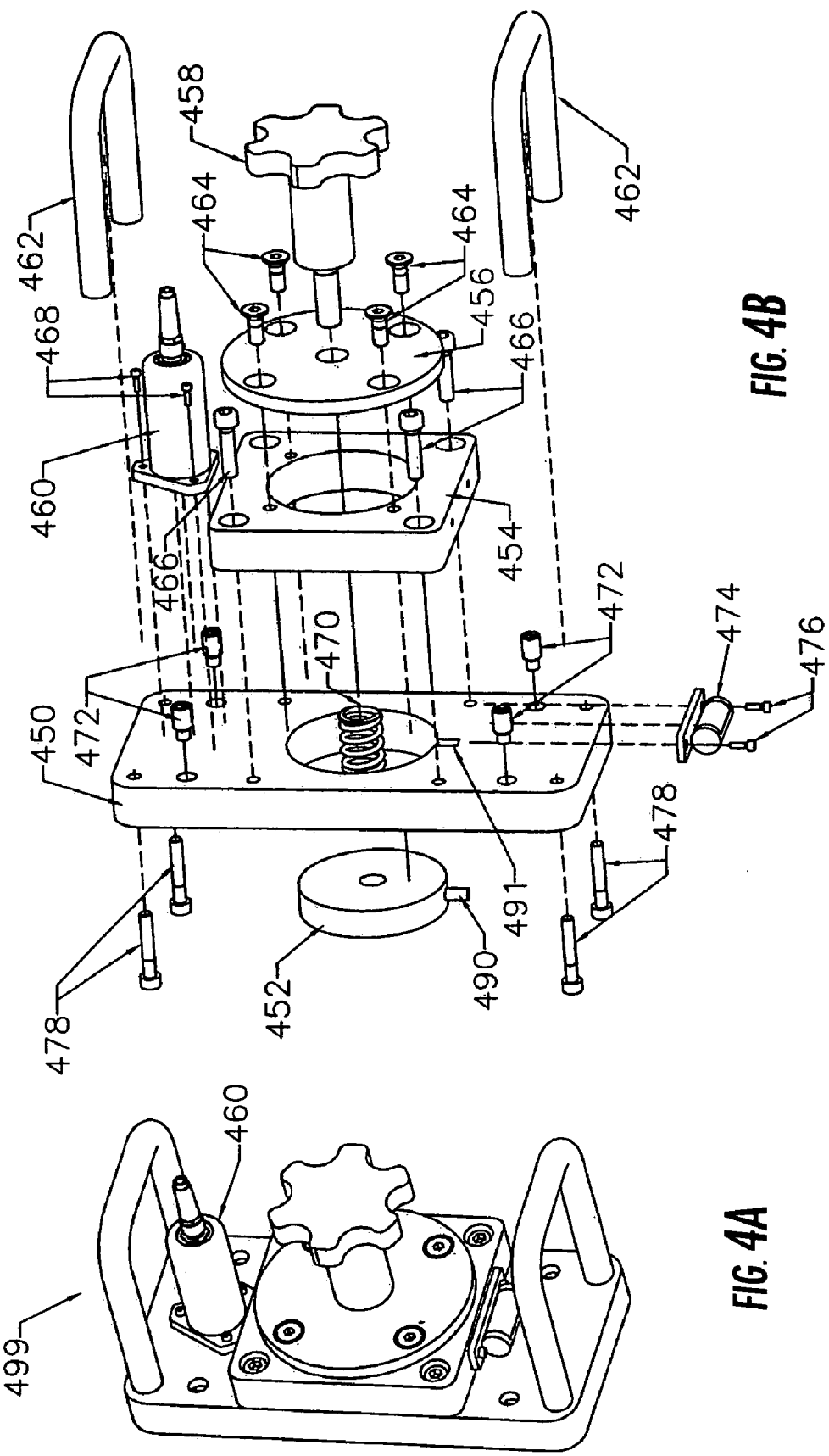
FIG. 4(a) is an assembled view of an inclinometer assembly
FIG. 4(b) is an exploded view of an inclinometer assembly.

FIG. 4(a) shows an assembled view of an inclinometer assembly 499. FIG. 4(b) shows an exploded view of an inclinometer assembly 499. This inclinometer assembly 499 is typical of the upper x-axis inclinometer 130, upper y-axis inclinometer 140, lower x-axis inclinometer 110, and lower y-axis inclinometer 120 shown in FIG. 1(b). The assembly consists of the inclinometer module 460, such as model Zerotronic type 3 as manufactured by Wyler AG Corporation, mounted on the inclinometer base 450, with the inclinometer module screws 468. The inclinometer module 460 is the sensor that measures the plumb inclination of the assembly attached to the shaft 20. The inclinometer module 460 transmits a digital signal encoded with the inclination measurement to the data acquisition system and micro computer 350.

The inclinometer assembly 499 is attached to a magnetic shaft 20 by way of the inclinometer mount magnet 452 which is engaged with, and disengaged from, the shaft 20 by way of a threaded knob 458 which engages into a mating threaded hole in the inclinometer mount magnet 452. The spring 470 supplies tension to the knob 458 and provides stability. The magnet dowel 490 on the side of the inclinometer mount magnet 452 and mating slot 491 in the inclinometer base 450 prevents rotation of the inclinometer mount magnet 452 as it is actuated. The knob 458 on the inclinometer mount magnet 452 assembly is supported by the base extension 454, attached to the inclinometer base 450 by the base extension screws 466, and the knob plate 456 which is attached to the base extension 454 by the knob plate screws 464.

Handles 462 are attached to the top and bottom of the inclinometer base 450 in order to handle the inclinometer assembly 499 and to protect the inclinometer module 460. The handles are attached to the inclinometer base 450 by the handle screws 478. A bubble level 474 is attached to the bottom of the base extension 454 by way of level screws 476. The bubble level 474 is used to level the inclinometer assembly 499 about the center axis passing through the inclinometer module 460 and perpendicular to the inclinometer base 450. Spring plungers 472 are screwed into equally spaced threaded holes in the inclinometer base 450 and are used to stabilize the inclinometer assembly 499 when attached to the shaft 20 by preventing side to side rocking motion.

Figure 5:
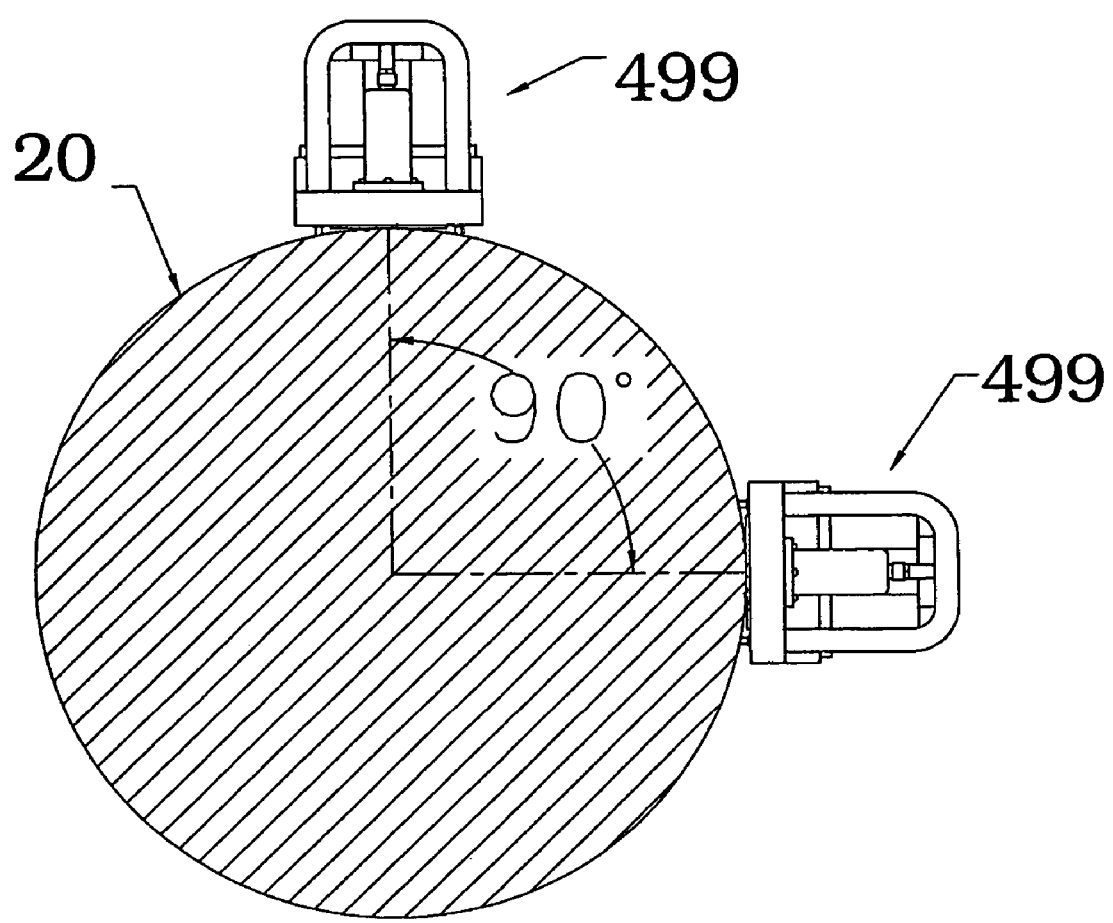
FIG. 5 is a cross sectional view of inclinometers attached to a shaft.

FIG. 5 shows a cross-sectional view of shaft 20 with an inclinometer assembly 499 mounted on each of two axes, 90 degrees apart, to allow for plumb inclination measurements on both axes at the same time. From this rectangular (x,y) measurement the overall polar or vector notation can be calculated by accepted mathematical methods to describe the plumb inclination of the shaft by a magnitude and angle relative to a fixed position.

FIGS. 6(a), 6(b) and 6(c) show perspective views of the arrangement of the inclinometer assembly 499 connection to the shaft 20 as viewed from above looking down and from the side relative to plumb. The inclinometer module 460 is attached to the inclinometer base 450 which is attached to the shaft 20 as shown in FIG. 5. The surfaces of the inclinometer base 450 are flat and parallel, thereby allowing the inclinometer module 460 to assume a perpendicular attachment to the shaft 20 as it is mounted. The flat contact surface on the inclinometer base 450 provides a single line contact 494 with the curved surface of the shaft 20. This single line contact 494 automatically squares the inclinometer base 450, and therefore the inclinometer module 460, perpendicular to the shaft 20 surface. This arrangement is superior to vee block arrangements because the single line contact 494 allows for only one possible alignment of the inclinometer assembly 499 to the shaft 20 and thereby the most accurate contact. Vee blocks have a two line contact arrangement that can skew the squaring of the component to the shaft as the vee block is rotated about its center axis during attachment to the shaft 20, and multiple contact surfaces provide for multiple contact errors. Therefore, a single line contact 494 provides for the least number of contact errors and the greatest accuracy. Spring plungers 472 in the inclinometer base 450 on either side of the single line contact 494 prevent side-to-side rocking motion of the inclinometer assembly 499 on the shaft 20 surface. As earlier explained, the mounting of the inclinometer mount magnet 452 with its dowel 490, shown in FIGS. 4(a) and 4(b), also helps to provide stability and resist the side-to-side rocking motion. The angle 492 of inclination of the shaft surface relative to the plumb can thereby be measured by the inclinometer module 460.

FIGS. 7(a) and 7(b) illustrate a proximity probe assembly 531. This assembly allows for multiple degrees of freedom of movement to facilitate the setup of the proximity sensor 500 relative to the shaft 20 when the assembly is attached to a stationary surface near the shaft. The proximity probe assembly 531 is attached to a stationary surface near the shaft 20 by the proximity probe magnet 508 which is attached to the proximity probe magnet base 506 by the magnet screw 528. The proximity probe magnet base 506 is attached to one end of the extension bracket 504 which can swivel about the base screw 526 and is locked by the magnet base knob 514. The extension bracket 504 can be moved about its longitudinal axis relative to the proximity probe magnet base 506 by way of a slot that accommodates the base screw 526. A slot is shown in the top portion of the extension bracket 504 but, another slot (not shown) also exists in the other leg of the bracket. Either of the two slots may be used to facilitate setup.

The tilting bracket 516 is attached to the other end of the extension bracket 504 and can be swiveled about the threaded tilting angle knob 510. The tilting angle knob 510 can be threaded and locked into a threaded hole in the extension bracket 504. The micrometer slide 502 is attached to the tilting bracket 516 by the micrometer slide screws 530. The micrometer slide 502 is a precision micrometer type micrometer slide that is capable of incrementing by 0.001 inch, such as the model 450 micrometer slide as manufactured by the Del-tron Corporation. This allows for precise movements of the proximity sensor 500 and facilitates its setup.

The proximity sensor 500, such as model PA222 as manufactured by the Electro Corporation, is mounted in the proximity probe mount 512 by sensor nuts 520, and the mount is connected to the micrometer slide 502 by the proximity probe mount screws 522. The setup of the proximity probe assembly 531 is accomplished by magnetically mounting the assembly near the shaft 20 and adjusting the multiple adjustment points such that the sensing end of the proximity sensor 500 is close to the shaft 20. Fine adjustment of the gap between the end of the proximity sensor 500 and the shaft 20 is accomplished by adjusting of the micrometer slide 502.

Figure 8:
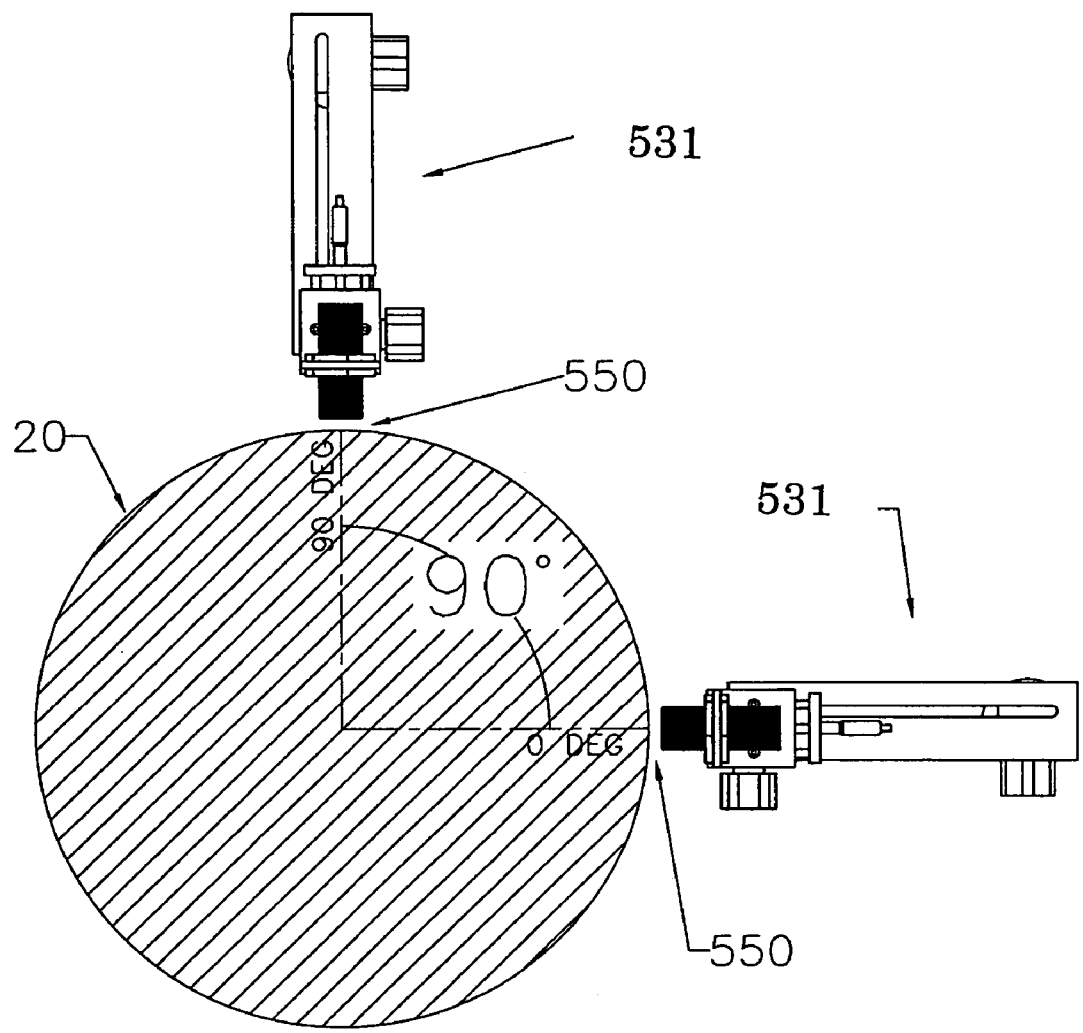
FIG. 8 is a cross sectional view of a proximity probe assembly relative to a shaft.

FIG. 8 shows a cross-sectional view of shaft 20 with a proximity probe assembly 531 mounted on each of two axes, 90 degrees apart, to allow for the displacement measurement on each axis at the same time. From this rectangular (x,y) measurement the overall polar or vector notation can be calculated by accepted mathematical methods to describe the radial movement of the center of the shaft 20 by a magnitude and angle relative to a fixed position. The proximity sensors 500 sense the position of the shaft 20 through an air gap 550 that is normally adjusted to the middle range position as specified by the manufacturer. The vertical shaft alignment tool 10 is able to use any type of displacement sensor, such as eddy current, capacitive, inductive, laser, or mechanical indicators and equivalents.

Figure 9:
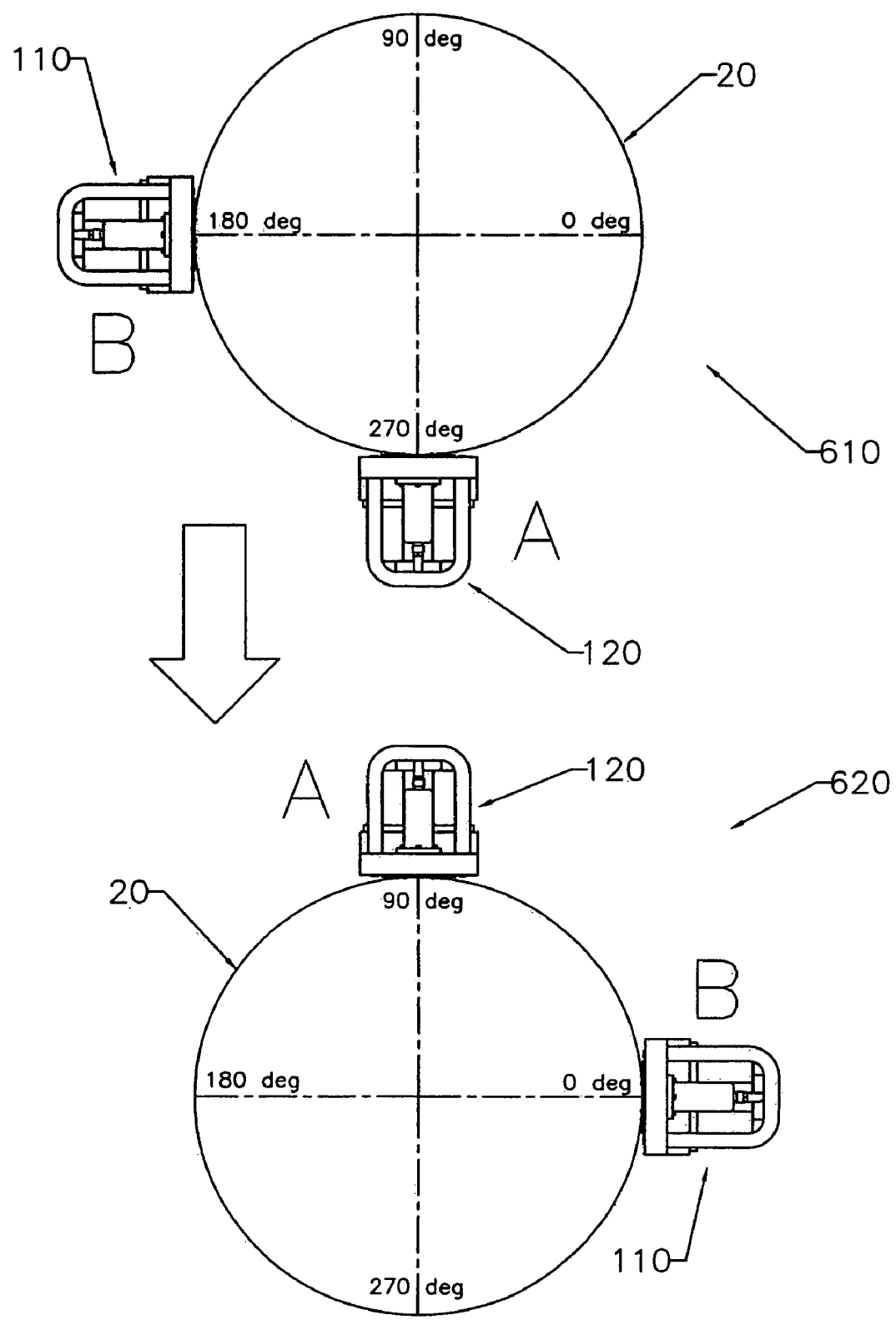
FIG. 9 is a perspective view of an inclinometer method of determining initial (static) plumb.

FIG. 9 illustrates an inclinometer method of measuring plumb inclination of a static shaft 20, single position. This inclinometer method allows for an initial measurement of the plumb inclination of the shaft 20, at a single position, without rotating the shaft 20 and is referred to as the static plumb method. FIG. 9 shows the lower x-axis inclinometer 110 and the lower y-axis inclinometer 120 which are attached to the shaft 20, 90 degrees apart, and which are referenced, respectively, as inclinometers B and A. Referencing a standard fixed Cartesian coordinate system, looking down, the x-axis is 0–180 degrees, and the y-axis is 90–270 degrees. This setup is also typical of the upper x-axis inclinometer 130 and upper y-axis inclinometer 140 on the upper portion of the shaft 20 above the shaft coupling 400 shown in FIGS. 1(a) and 1(b).

In the initial plumb method, inclinometer A is mounted at the 270 degree position on the shaft 20, and inclinometer B is mounted at the 180 degree position on the shaft 20. Measurement of the plumb inclination is read from both inclinometers and recorded respectively as A270 and B180. This is shown as the first static plumb reading 610 in FIG. 9. The inclinometer A is then moved to the 90 degree position on the shaft, and inclinometer B is moved to the 0 degree position of the shaft 20. This is shown as the second static plumb reading 620 in FIG. 9. Measurement of plumb inclination is read from both inclinometers and recorded, respectively, as A90 and B0.

Initial plumb is calculated by the following equation for the two axes, x and y: x equation, (B0−B180)/2=out of plumb inclination P1; y equation, (A90−A270)/2=out of plumb inclination P2. From this rectangular (x,y) measurement the overall polar or vector notation can be calculated by accepted mathematical methods to describe the plumb inclination of the shaft 20 by a magnitude and angle relative to a fixed position. Measurement of the plumb inclination is typically read in inches per foot of slope; however, other angular measurement units can be used. When using a Wyler AG Zerotronic inclinometer, a positive inclination indicates the bottom of the shaft is toward the 0 or 90 degree positions, as defined by the second static plumb reading 620 in FIG. 9. Other inclinometers may be different.

As long as the inclinometers are not disturbed from their last position as defined in the second static plumb reading 620 in FIG. 9, any deviations of the shaft's plumb inclination can be thereafter monitored and calculated, without moving the inclinometers. This method is performed by calculating what the x and y axis inclinometers should read in order to yield a perfectly plumb inclination (i.e., zero inclination). Thereby, when the shaft 20 is perfectly plumb, the inclinometers would indicate the calculated reading for perfectly plumb inclination. For the x-axis, or B inclinometer, the perfectly plumb value is calculated by the equation (B0−P1)=plumb inclination reading PP1. For the y-axis, or A inclinometer, the perfectly plumb value is calculated by the equation (A90−P2)=plumb inclination reading PP2. PP1 and PP2 are the plumb inclination readings that the inclinometers B and A, respectively, will read when the shaft 20 is perfectly plumb. Any deviations in the shaft's plumb inclination can be measured by comparing the current inclinometer readings with PP1 and PP2. The current out-of-plumb inclination can be calculated for the x-axis, or B inclinometer, by the equation (B0−PP1)=x-axis plumb inclination. The current out-of-plumb inclination can be calculated for the y-axis, or A inclinometer, by the equation (A90−PP2) =y-axis plumb inclination.

Figure 10:
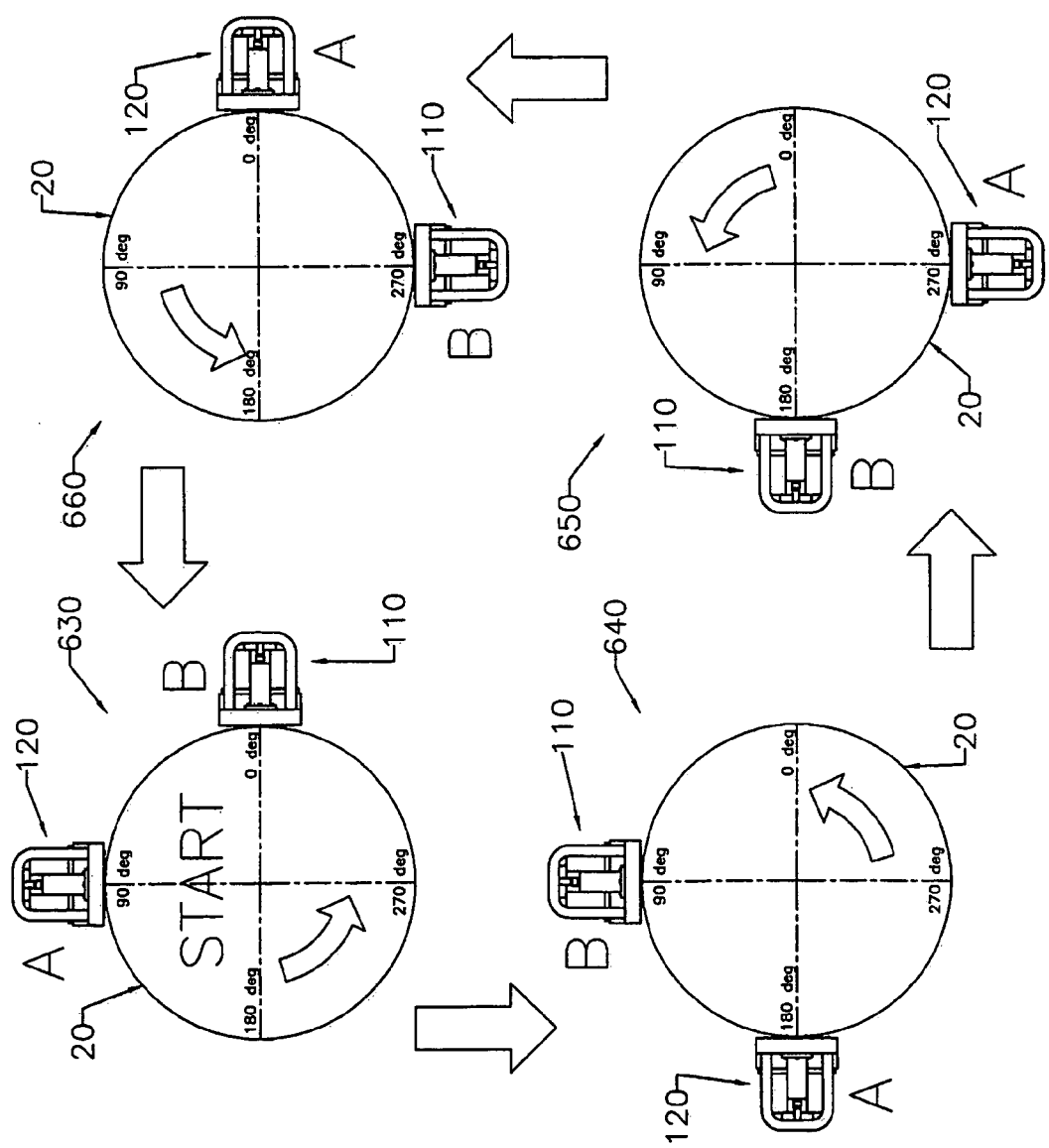
FIG. 10 is a perspective view of an inclinometer method of determining rotational plumb.
Figure 11:
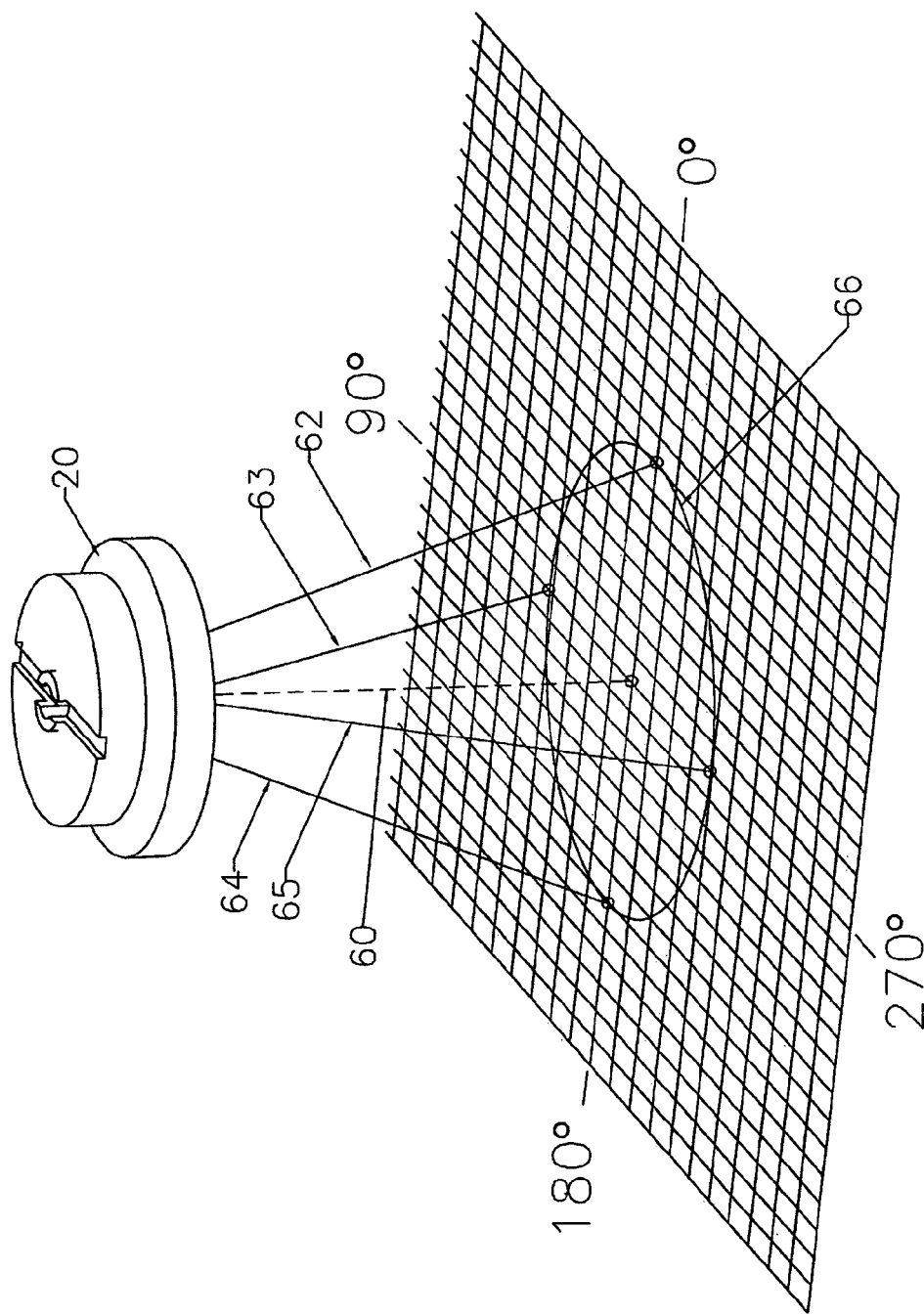
FIG. 11 is a perspective view of a shaft centerline throw circle.

FIG. 10 illustrates an inclinometer method of measuring plumb inclination of a shaft's center of rotation by rotating the shaft 20, and is referred to as the rotational plumb method. As the shaft 20 is rotated, it will revolve around a virtual normal shaft centerline 60, as shown in FIG. 11, and this is referred to as the center of rotation. Plumbing the center of rotation is desired since the loads on the guide and thrust bearings will be distributed equally on the bearing surfaces for each revolution of the shaft. This minimizes temperature problems and increases bearing reliability.

The rotational plumb method is the more accurate of the two inclinometer methods of measuring plumb inclination since the inclinometers remain fixed at one position of the shaft 20 (not moved relative to shaft) and the plumb inclination is measured relative to the center of rotation of the shaft 20, as it would normally operate. The rotational plumb method consists of setting inclinometer assemblies 499 B and A, 90 degrees apart on the shaft 20, at one elevation on the shaft 20 and reading the inclinometer's inclination at 4 equally spaced shaft positions by rotating the shaft 20. The shaft 20 is rotated in 90 degree increments, stopped at each increment, and the inclinometer assemblies 499 B and A are read.

FIG. 10 shows the lower x-axis inclinometer 110 and the lower y-axis inclinometer 120 which are attached to the shaft 20, 90 degrees apart, and which are referenced, respectively, as inclinometers B and A. Referencing standard fixed Cartesian coordinate system, looking down, the x-axis is 0–180 degrees, and the y-axis is 90–270 degrees. This setup is also typical of the upper x-axis inclinometer 130 and the upper y-axis inclinometer 140 on the upper portion of the shaft 20 above the shaft coupling 400.

The start position is referred to as the rotational plumb reading 0 degree position 630, with inclinometer B attached to the 0 degree position and inclinometer A attached to the 90 degree position. Measurement of the plumb inclination, such as in inches per foot, is recorded as B0 and A90 for the B and A inclinometers, respectively. Without moving or disturbing the inclinometers, the shaft 20 is rotated 90 degrees to the next position referred to as the rotational plumb reading 90 degree position 640. Measurement of the plumb inclination is recorded as B90 and A180 for the B and A inclinometers respectively. Without moving or disturbing the inclinometers, the shaft is rotated 90 degrees to the next position, referred to as the rotational plumb reading 180 degree position 650. Measurement of the plumb inclination is recorded as B180 and A270 for the B and A inclinometers respectively. Without moving or disturbing the inclinometers, the shaft 20 is rotated 90 degrees to the next position, referred to as the rotational plumb reading 270 degree position 660. Measurement of the plumb inclination is recorded as B270 and A0 for the B and A inclinometers, respectively. Without moving or disturbing the inclinometers, the shaft is rotated 90 degrees to the next position referred to as the rotational plumb reading 0 degree position 630, or the original starting point. Measurement of the plumb inclination is recorded as B360 and A450 for the B and A inclinometers, respectively.

FIG. 10 shows the shaft 20 being turned counterclockwise as the measurements are taken; however, it is possible to turn the shaft in the opposite direction as long as the inclinometers are read correctly, that is, identified in the correct location.

By using two inclinometers spaced at 90 degrees and taking readings at four equally spaced rotational positions, the plumb inclination of the shaft's center of rotation can be calculated twice; once from the 0 to 180 degree rotation and again from the 90 to 270 degree rotation. Plumb inclination of a shaft's center of rotation can be calculated for the x-axis by the equation $(B0-B180)/2$=out of plumb P1, and for the y-axis by the equation $(A90-A270)/2$=out of plumb P2, by using the 0 to 180 degree rotational readings. Plumb inclination can be calculated again for the x-axis by the equation $(A0-A180)/2$=out of plumb P1, and for the y-axis by the equation $(B90-B270)/2$=out of plumb P2, by using the 90 to 270 degree rotational readings.

In both cases above, P1 (from 0–180 degrees) should equal P1 (from 90–270 degrees), and P2 (from 0–180 degrees) should equal P2 (from 90–270 degrees). If they do not match, the turbine runner, shaft 20, or other rotating part could have contacted a stationary point as the shaft 20 was rotated. This method acts as a check to detect problems in the rotation of shaft 20. From this rectangular (x,y) measurement the overall polar or vector notation can be calculated by accepted mathematical methods to describe the plumb inclination of the shaft 20 by a magnitude and angle relative to a fixed position.

As long as the inclinometers are not disturbed from their last position, as defined in the rotational plumb reading 0 degree position 630 in FIG. 10, any deviations of the shaft's plumb inclination can be thereafter monitored and calculated without moving the inclinometers and without rotating the shaft again. This method is performed by calculating what the x and y axis inclinometers should read in order to yield a perfectly plumb inclination (i.e., zero inclination). Thus, when the shaft 20 is perfectly plumb, the inclinometers would indicate the calculated reading for perfectly plumb inclination. For the x-axis, or B inclinometer, the perfectly plumb value is calculated by the equation $(B0-P1)$=plumb inclination reading PPR1. For the y-axis, or A inclinometer, the perfectly plumb value is calculated by the equation $(A90-P2)$=plumb inclination reading PPR2. PPR1 and PPR2 are the plumb inclination readings that the inclinometers B and A, respectively, will read when the shaft 20 is perfectly plumb. Any deviations in the shaft's plumb inclination can be measured by comparing the current inclinometer readings with PPR1 and PPR2. The current out-of-plumb inclination can be calculated for the x-axis, or B inclinometer, by the equation $(B0-PPR1)$=x-axis plumb inclination. The current out of plumb inclination can be calculated for the y-axis, or A inclinometer, by the equation $(A90-PPR2)$=y-axis plumb inclination. From this rectangular (x,y) measurement the overall polar or vector notation can be calculated by accepted mathematical methods to describe the plumb inclination of the shaft by a magnitude and angle relative to a fixed position.

Figure 12A:
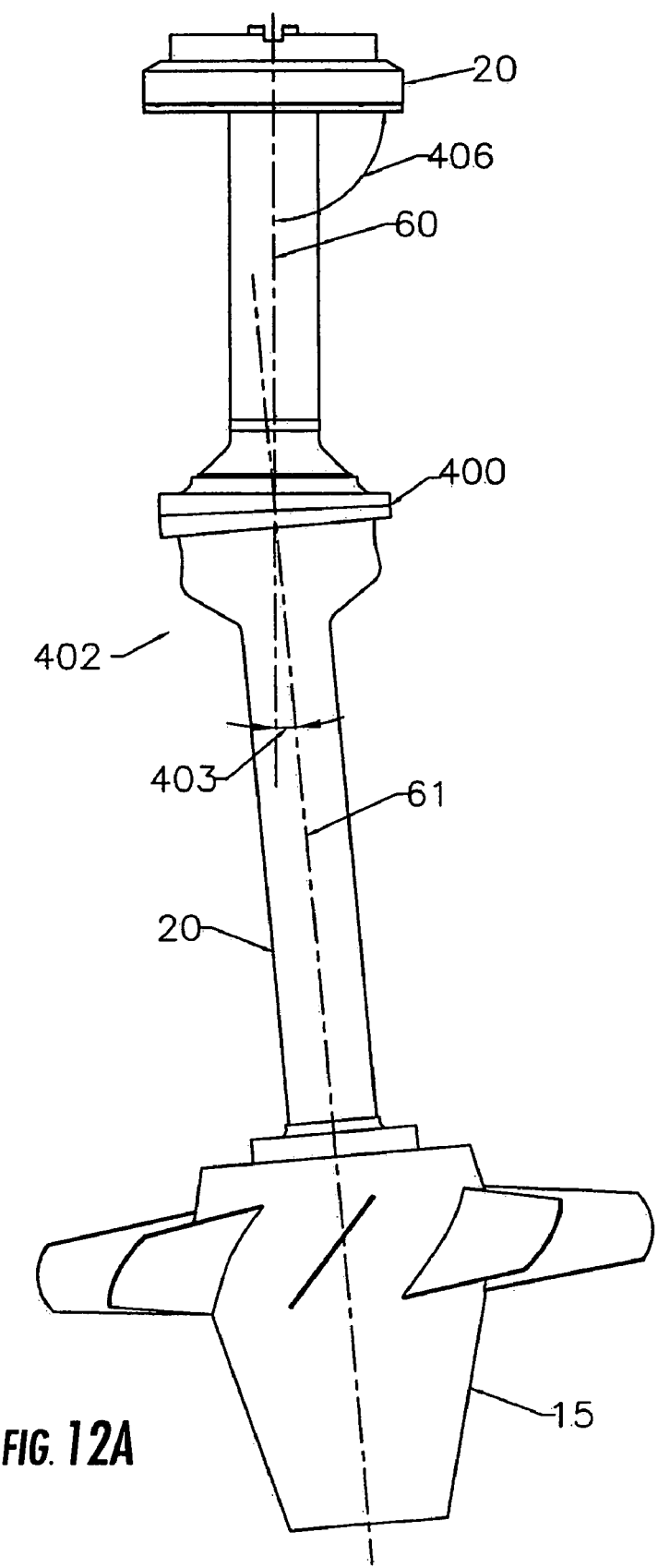
FIG. 12(a) is a perspective view of a shaft coupling kink.

FIG. 11 is a perspective view of a shaft centerline throw circle 66. The shaft centerline throw circle 66 is caused by the shaft's thrust collar or thrust bearing runner/journal not being machined perfectly square to the shaft's rotational axis or normal shaft centerline 60. This results in an angle different from the preferred 90 degrees shown as the thrust collar angle 406 in FIG. 12(a). The thrust collar angle 406 of 90 degrees would result in a non-existent throw circle. The vertical shaft alignment tool 10 can measure the shaft centerline throw circle 66 magnitude by two methods referred to as the inclinometer method and proximity probe method. The more accurate of the two methods is the proximity probe method. The inclinometer method is considered an approximate measurement method since the shaft contact surface condition between the inclinometer base 450 and the shaft 20 can skew the results.

In the inclinometer method, unitized (i.e., inches per foot of slope) shaft throw (run out), can be calculated by comparing the plumb inclination of the normal shaft centerline 60 to the plumb inclination at one position on the shaft centerline throw circle 66. As an example, comparing the plumb inclination of the normal shaft centerline 60 to the shaft centerline 0 degree position 62, as shown in FIG. 11, yields the radius of the shaft centerline throw circle 66. This can also be done with the shaft centerline 90 degree position 63, shaft centerline 180 degree position 64, and the shaft centerline 270 degree position 65 to yield similar results. Assuming the inclinometers have not been disturbed since the plumb inclination of a shaft's center of rotation was calculated, the shaft centerline throw circle 66 radius magnitude can be calculated by subtracting the perfectly plumb results for plumb inclination found in the rotational plumb method, PPR1 and PPR2, from the perfectly plumb indications for plumb inclination found in the static plumb method, PP1 and PP2, respectively. The results of this calculation yield x and y coordinates that can be converted to polar or vector notation which will yield the magnitude of the shaft centerline throw circle 66 as a vector (unitized: i.e., inches per foot). Actual throw (i.e., inches), run out, at a given elevation can be calculated by multiplying the vector's magnitude by the distance from the thrust bearing assembly 90. Since the vector is actually the radius of the shaft centerline throw circle 66, it is multiplied by 2 to yield the diameter. The vector's angle component is the direction that the bottom of the shaft 20 is pointing toward.

In the proximity probe method, proximity sensors are used to measure shaft 20 movements relative to a fixed point as the shaft is rotated. The shaft centerline throw circle 66 magnitude is measured by mounting multiple sets of two proximity sensors 500 at different elevations relative to the shaft 20 but sharing the same vertical planes. Proximity sensors 500 are mounted on the x-axis at the 0 degree position and on the y-axis at the 90 degree position, as shown in FIG. 8. With these x and y proximity sensors 500, 90 degrees apart, the displacement of the center of the shaft 20 can be measured. FIGS. 1(*a*) and 1(*b*) show four pairs of proximity sensors 500, with one pair mounted at each of elevation 1 (212), elevation 2 (192), elevation 3 (172), and elevation 4 (152). The shaft is rotated in 90 degree increments, referred to as 0, 90, 180, and 270 degree rotational positions, and stopped at each position, and the displacement readings are read for each proximity sensor. The initial proximity sensor 500 displacement readings from the 0 rotational position are subtracted from all other rotational position readings in order to zero the proximity sensor 500 displacement readings. Therefore, the 0 rotational position readings will all be zero, and all the other rotational position readings, taken as the shaft 20 is rotated, will be relative to the 0 rotational position readings.

The top set of x and y proximity sensor 500 displacement readings at elevation 1 (212) are subtracted from the corresponding x and y readings at elevation 2 (192), elevation 3 (172), and elevation 4 (152) in order to subtract out any skate or radial movement that might occur as the shaft 20 is rotated and possibly moved in the radial guide bearing clearance. This yields the net radial shaft 20 displacement (run out) at each elevation and is shown in FIG. 11 at the shaft centerline 0 degree position 62, shaft centerline 90 degree position 63, shaft centerline 180 degree position 64, and the shaft centerline 270 degree position 65.

The actual shaft centerline throw circle diameter 66 at each elevation is calculated from the four rotational position readings (rotational positions 0, 90, 180, and 270 degrees) by choosing three of the four points to pass a circle through. Commonly available mathematical methods are used to calculate the diameter of a circle passing through these three points, yielding the shaft centerline throw circle 66 magnitude, or the same can be accomplished by standard graphical or plotting methods. By subtracting the center x and y coordinates of this calculated circle from the proximity sensor 500 displacement readings at the last rotational position and converting results to polar or vector notation, the magnitude of the shaft centerline throw circle 66 vector, and the directional angle the bottom of the shaft 20 is pointing to can be found at each of the four elevations. The shaft centerline throw circle 66 calculated for the each of the different elevations allows for the calculation of shaft 20 straightness, shaft kink 402, and shaft coupling offset 404 as shown in FIGS. 12(*a*) and 12(*b*).

Figure 12B:
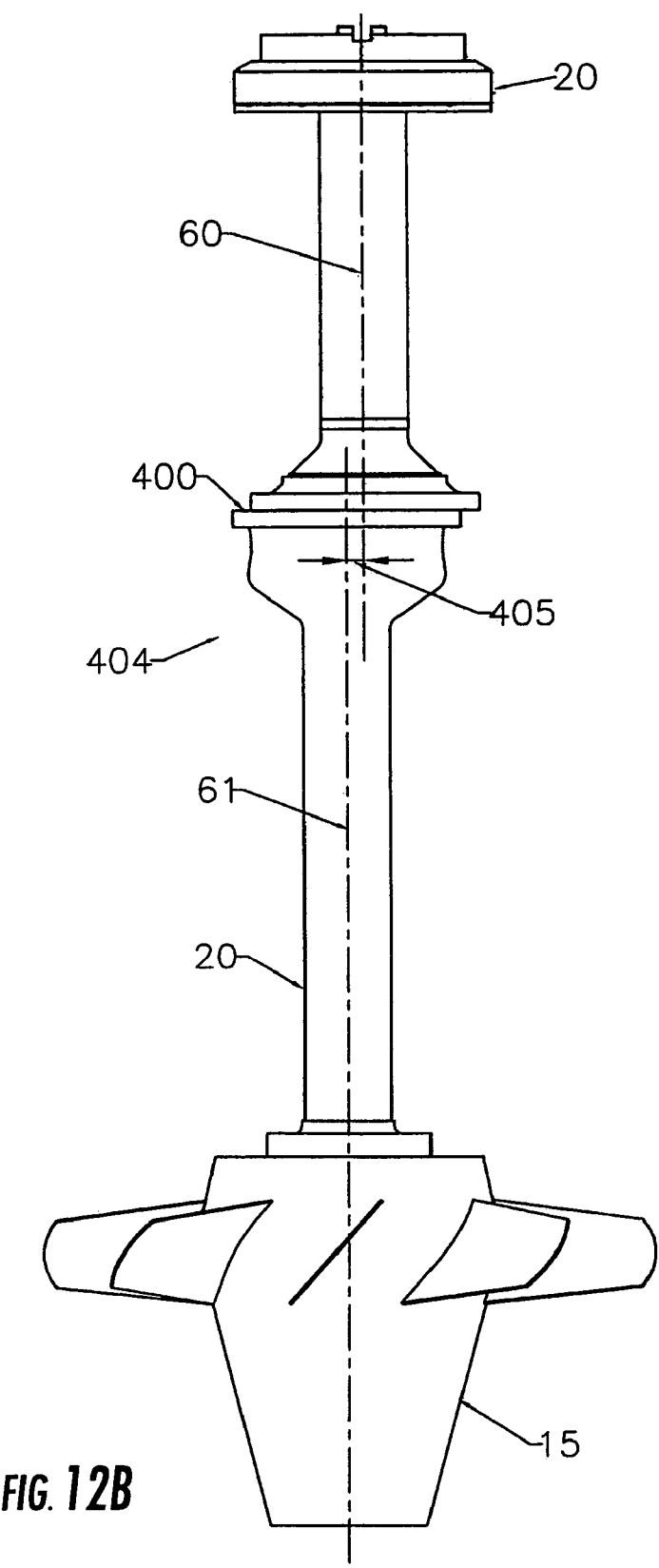
FIG. 12(b) is a perspective view of a shaft coupling offset.

FIGS. 12(*a*) and 12(*b*) are perspective views of the shaft kink 402 and the coupling offset 404 conditions. Shaft kink 402 (dogleg) is a condition in which a shaft 20 is bent or in which two coupled shafts do not share axes on parallel planes. The vertical shaft alignment tool can measure shaft kink 402 by two different methods.

The first method of measuring kink is to measure the plumb deviation of the shaft 20 at different elevations by using the static plumb method as shown in FIG. 9. A straight (non-kinked) shaft 20 would exhibit the same plumb measurement, magnitude and direction at each elevation. With coupled shafts (typical for hydroelectric shafts) the plumb inclination is measured on each side of the coupling 400. The difference between the plumb inclinations of two elevations is the amount of kink in the shaft 20 between those elevations. Accuracy of this method is limited to the condition of the shaft 20 surface to which the inclinometer base 450 is mounted.

The second method of measuring kink is by using the shaft centerline throw circle 66 vectors as calculated above regarding the proximity probe method of measuring the shaft centerline throw circle 66 at different elevations. Shaft kink 402 is calculated by comparing the difference in the shaft centerline throw circle 66 vectors from elevation 1 (212) to elevation 2 (192) with the difference from elevation 3 (172) to elevation 4 (152). Differences are divided by distances (i.e., feet) from elevation 1 (212) to elevation 2 (192) and elevation 3 (172) to elevation 4 (152), respectively, yielding unitized (i.e., inches per foot of distance) shaft centerline throw circle 66 vector deviations for each section of shaft 20 (the section above the shaft coupling 400 versus the section below the shaft coupling 400). A straight (non-kinked) shaft 20 would exhibit the same unitized shaft centerline throw circle 66 vector magnitude, in the same direction (in phase), for each section of shaft 20. The difference between the unitized shaft centerline throw circle 66 vector magnitudes is the amount of kink 403 existing between those shaft sections. The direction of the kink 403 can be found be analyzing the shaft centerline throw circle 66 vector angles.

Shaft coupling offset 404 is a condition in which two coupled shaft's axes do not share the same normal shaft centerline 60 or are not concentric as shown in FIG. 12(*b*). The vertical shaft alignment tool invention measures shaft coupling offset 404 by using the shaft centerline throw circle 66 vectors as calculated in the discussion above regarding the proximity probe method of measuring the shaft centerline throw circle 66 at different elevations. As in the shaft kink method above, the shaft coupling offset 404 is calculated by comparing the difference in the shaft centerline throw circle 66 vectors from elevation 1 (212) to elevation 2 (192) with the difference from elevation 3 (172) to elevation 4 (152). The differences are divided by the distances (i.e., feet) from elevation 1 (212) to elevation 2 (192) and elevation 3 (172) to elevation 4 (152), respectively, yielding unitized (i.e., inches per foot of distance) shaft centerline throw circle 66 vector deviations for each section of shaft 20 (the section above the shaft coupling 400 versus the section below the shaft coupling 400). These unitized shaft centerline throw circle 66 vectors are extrapolated (inches per foot times distance) to the shaft coupling 400 split. If these extrapolated shaft centerline throw circle 66 vectors are equal then the shaft offset 404 is zero. The difference between the extrapolated shaft centerline throw circle 66 vectors is the amount of offset 405 in the shaft's centerlines. The direction of the offset can be found by analyzing the shaft centerline throw circle 66 vector angles.

Figure 13:
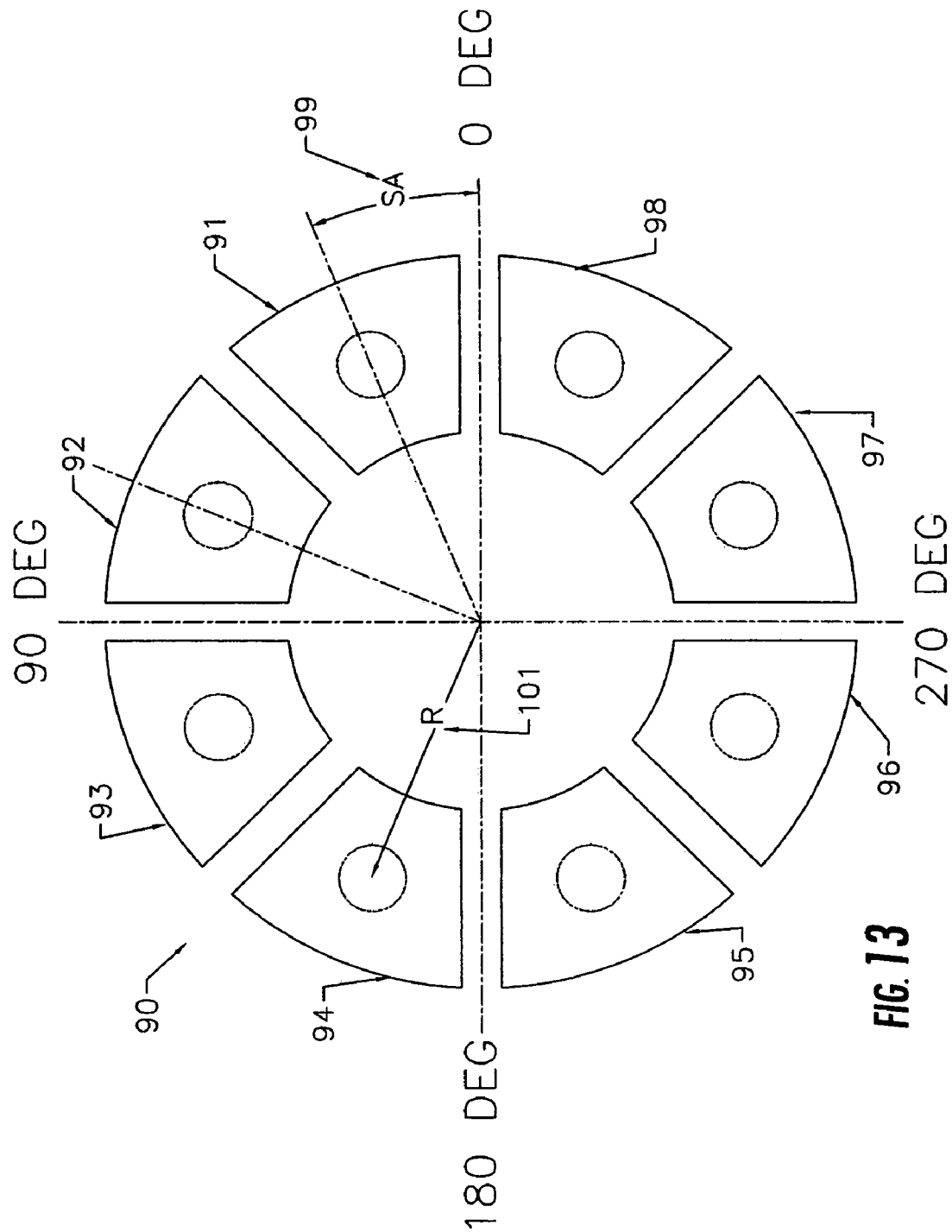
FIG. 13 is a perspective view of a thrust bearing shoe segment assembly.
Figure 14:
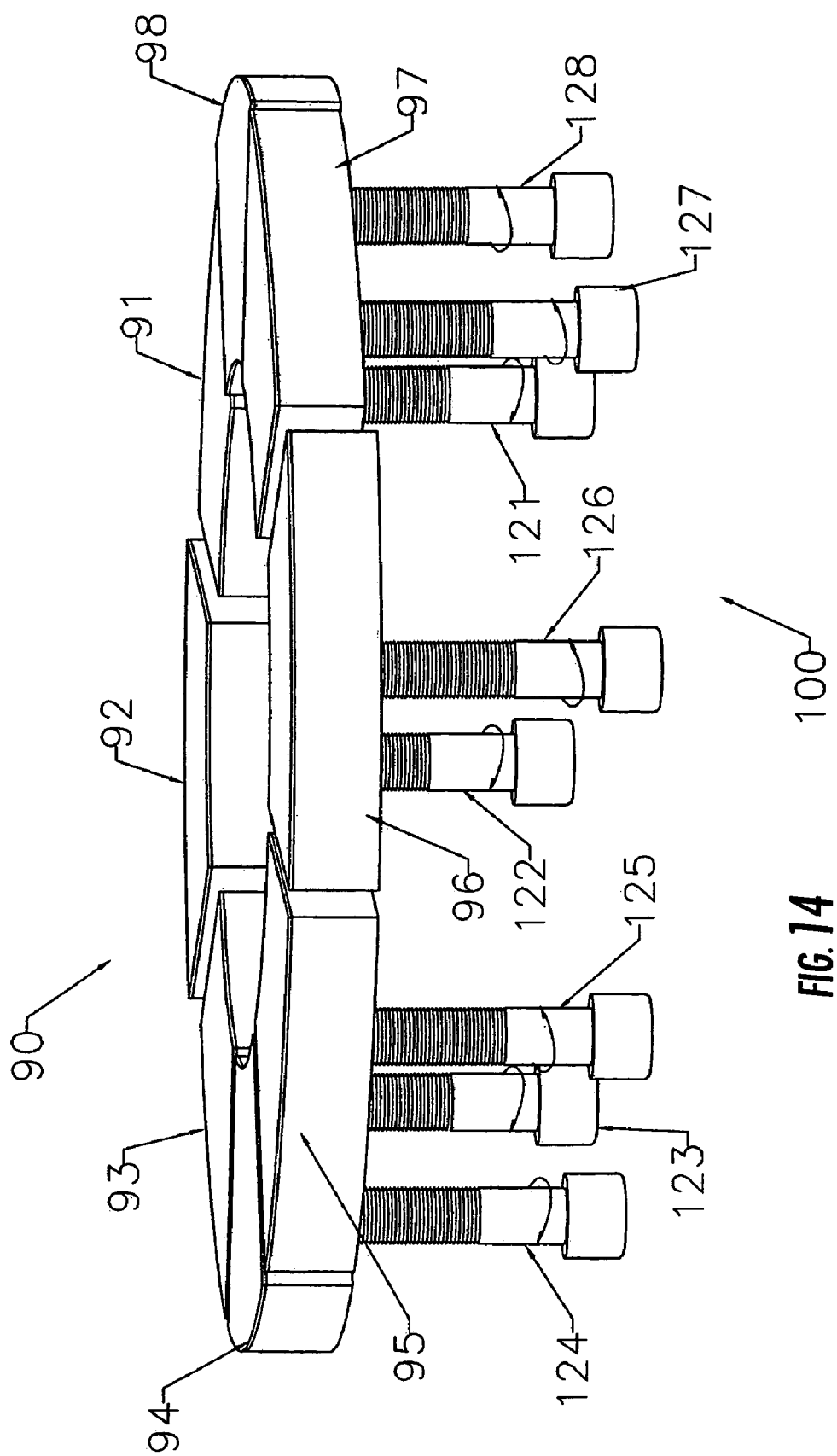
FIG. 14 is a perspective view of a thrust bearing shoe and elevation adjustment screw assembly.

FIG. 13 is a perspective plan view of a thrust bearing shoe assembly 90, with 8 shoes, that is also shown in FIG. 1(*b*). FIG. 14 is a perspective side view of the thrust bearing shoe assembly 90 and of an elevation adjustment screw assembly 100 that also is shown in FIG. 1(*b*). Vertical hydroelectric shafts typically use multi-segment thrust bearings like those manufactured by Kingsbury Corporation. The number of shoes usually vary from 6 to 16 shoes, with 8 shoes being common for hydroelectric turbine generators. These types of bearings have a jack screw (adjustment screw) under each thrust bearing shoe for adjusting its elevation and load. The vertical shaft alignment tool 10 includes a method of correcting deviations of a shaft's plumb inclination to the perfectly plumb position or another plumb inclination position by adjusting the thrust bearing assembly shoe elevations shown in FIGS. 13 and 14. This method allows for changes in the plumb inclination without changing the thrust load on the thrust bearing assembly 90 or the individual load on each thrust bearing shoe.

The vertical shaft alignment tool 10 uses a vector analysis method to calculate the individual thrust bearing shoe elevational changes to move or swing the shaft 20 to the corrected plumb inclination position. In this method the x and y components of plumb inclination, as calculated above relative to FIGS. 9 and 10, are converted from their rectangular form to polar or vector form. As in all of the above methods, the standard Cartesian coordinate system is used, as shown in FIG. 13. The magnitude of the plumb inclination vector (typically in inches per foot) is referred to as variable RV and is calculated by the equation $$RV = SQRT(x^2 + y^2). \quad (1)$$

The angle of the plumb inclination vector (degrees) is referred to as variable ANG and is calculated by the equation $$ANG = \tan^{-1}(x/y) \text{ (in degrees)}. \quad (2)$$

In FIG. 13, the variable R is the thrust adjustment screw pin circle radius 101 (typically in inches); the variable SA 99 is the individual thrust bearing shoe offset angle from 0 degrees (in degrees) that will vary according to each thrust bearing shoe position. The elevational change movement of an individual thrust bearing shoe is referred to as variable SM (thrust bearing shoe movement typically in inches). The thrust bearing shoe movement SM is calculated by the equation $$SM = -1(RV*(R/12))*(COS((SA-ANG)). \quad (3)$$

A positive result would move the thrust bearing shoe up, and a negative result would move the thrust bearing shoe down.

As an example, for a 8 shoe thrust bearing, suppose the shaft 20 inclination was measured to be 0.001 inch per foot out of plumb toward the 67.6 degrees position. Using the standard Cartesian coordinate system, as shown in FIG. 13, the turbine runner 15 would be bending toward the center of the second thrust shoe 92. Using the equation SM=−1(RV*(R/12))*(COS(SA−ANG)) to calculate each shoe movement (SM) to plumb the shaft for the eight shoe example, shown in FIGS. 13 & 14, for the first thrust shoe 91, then RV equals 0.001 inch, SA equals 22.5 degrees, ANG equals 67.5 degrees, and we assume R in this example is 30 inches, and calculate as follows:

SM (shoe 91)=−1(0.001*(30/12))*(COS(22.5−67.5))=−0.0018 INCH

For the other seven shoes, the SM values are calculated by inputting their respective angular positions, SA, as follows:

SM (shoe 92)=−1(0.001*(30/12))*(COS(67.5−67.5))=−0.0025 INCH

SM (shoe 93)=−1(0.001*(30/12))*(COS(112.5−67.5))=−0.0018 INCH

SM (shoe 94)=−1(0.001*(30/12))*(COS(157.5−67.5))=0.0000 INCH

SM (shoe 95)=−1(0.001*(30/12))*(COS(202.5−67.5))=+0.0018 INCH

SM (shoe 96)=−1(0.001*(30/12))*(COS(247.5−67.5))=+0.0025 INCH

SM (shoe 97)=−1(0.001*(30/12))*(COS(292.5−67.5))=+0.0018 INCH

SM (shoe 98)=−1(0.001*(30/12))*(COS(337.5−67.5))=0.0000 INCH

Assuming all thrust shoes are loaded equally, then, the shoe movements (SM) are implemented, the shaft 20 will move or swing to the plumb position. Shaft plumbing corrections, and corresponding shoe movements SM, for a thrust bearing with shoe numbers different from 8 shoes, can be calculated using the same method and equation but with appropriate shoe offset angle SA.

The same method can be applied to shafting systems which have fixed, non-adjustable thrust bearing assemblies 90 (such as spring-loaded thrust bearings) by calculating elevational changes (shim changes would equal shoe movements SM) applied to the thrust supports under the stationary surrounding structure supporting the thrust bearing assembly.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A vertical shaft alignment tool comprising:
   a plurality of inclinometers assemblies to measure the deviation from plumb of a shaft;
   a plurality of proximity probe assemblies to measure the distance of the shaft from a reference point; and
   at least one data acquisition device capable of communicating with at least one of the inclinometer assemblies and proximity probe assemblies.

2. The vertical shaft alignment tool of claim 1 comprising:
   at least one transmitter unit for transmitting inclinometer measurement data.

3. The vertical shaft alignment tool of claim 2 comprising:
   at least one receiver unit for communicating with at least one transmitter unit.

4. The vertical shaft alignment tool of claim 2,
   wherein at least one receiver unit is capable of wireless communications with at least one transmitter unit.

5. The vertical shaft alignment tool of claim 1 comprising:
   a computer for communicating with at least one of the of the data acquisition devices and processing and analyzing data collected from the data acquisition device.

6. The vertical shaft alignment tool of claim 5,
   wherein the computer is attached to a network.

7. The vertical shaft alignment tool of claim 5,
   wherein the processing and analyzing of the computer includes the calculation of the deviation from plumb of the shaft.

8. The vertical shaft alignment tool of claim 5,
   wherein the processing and analyzing of the computer includes the calculation of an inclination of the shaft using at least one of a static plumb method and a rotational plumb method.

9. The vertical shaft alignment tool of claim 5,
   wherein the processing and analyzing of the computer includes the calculation of a throw circle of the shaft using at least one of an inclinometer method and a proximity probe method.

10. The vertical shaft alignment tool of claim 5,
    wherein the processing and analyzing of the computer includes the calculation of a kink of the shaft using at least one of a static plumb method and a shaft centerline throw circle vector method.

11. The vertical shaft alignment tool of claim 5,
wherein the processing and analyzing of the computer includes the calculation of an offset of a shaft coupling.

12. The vertical shaft alignment tool of claim 5,
wherein the processing and analyzing of the computer includes the calculation of a thrust bearing shoe elevation changes to correct deviations from plumb of the shaft.

13. The vertical shaft alignment tool of claim 1,
wherein the data acquisition device is capable of communications with at least one other data acquisition device.

14. An inclinometer assembly for measuring the plumb of a shaft comprising: an inclinometer module for measuring the plumb indication of the assembly;
an inclinometer base on which the inclinometer module is mounted;
a mount magnet to attach and stabilize the inclinometer base to the shaft, and
a threaded knob to engage/disengage the mount magnet to the shaft.

15. The inclinometer assembly of claim 14 comprising:
a spring to stabilize the connection between the threaded knob and the mount magnet.

16. An inclinometer assembly for measuring the plumb of a shaft comprising:
an inclinometer module for measuring the plumb indication of the assembly;
an inclinometer base on which the inclinometer module is mounted;
a mount magnet to attach and stabilize the inclinometer base to the shaft, and
wherein the inclinometer base provides a single line contact with the shaft.

17. An inclinometer assembly for measuring the plumb of a shaft comprising:
an inclinometer module for measuring the plumb indication of the assembly;
an inclinometer base on which the inclinometer module is mounted;
a mount magnet to attach and stabilize the inclinometer base to the shaft; and
wherein the mount magnet includes an anti-rotation mechanism comprising a dowel that fits a slot in the inclinometer base; and
wherein the inclinometer base has a slot for receiving the dowel of the mount magnet.

18. A proximity probe assembly for measuring the distance to a shaft comprising:
a proximity probe base;
a mount magnet base;
an extension bracket which is attached to the proximity probe base and the mount magnet base;
a proximity probe which is attached to the proximity probe base; and
a mount magnet which is attached to the mount magnet base,
wherein the proximity probe base comprises a micrometer slide for adjusting the gap between the proximity probe and the shaft.

19. The proximity probe assembly of claim 18,
wherein the proximity probe base comprises a probe mount that attaches the proximity probe to the micrometer slide and a tilting bracket that attaches the micrometer to the extension bracket.

20. The proximity probe assembly of claim 19,
wherein the tilting bracket is adjustably connected to the extension bracket for swiveling the proximity probe position relative to the shaft.

21. A vertical shaft alignment tool comprising:
means for measuring the inclination of a shaft;
means for measuring the position of the shaft with respect to a fixed reference; and
means for communicating the inclination and position readings to a computing device.

22. The vertical shaft alignment tool of claim 21 comprising:
means for calculating a displacement of the shaft; and
means for calculating a throw circle.

23. The vertical shaft alignment tool of claim 21 comprising:
means for calculating a kink in the shaft.

24. The vertical shaft alignment tool of claim 21 comprising:
means for calculating an offset in a shaft coupling.

25. A method of aligning a vertical shaft comprising the steps of:
providing a vertical shaft alignment tool comprising:
a plurality of inclinometers assemblies to measure the deviation from plumb of a shaft; and
at least one data acquisition device capable of communicating with at least one of the inclinometer assemblies and proximity probe assemblies;
measuring a first and second set of static inclination readings of the shaft at a first elevation of the shaft using a static plumb method;
calculating a static plumb position of the shaft based on the first and second set of static inclination readings;
measuring a first, second, third and fourth set of rotational inclination readings of a center of rotation of the shaft at a second predetermined elevation of the shaft using a rotational plumb method;
calculating an inclination of a center of rotation of the shaft at the second predetermined elevation of the shaft based on the first, second, third and fourth set of rotational inclinational readings; and
calculating a shaft centerline throw circle based on the static inclination of the shaft and the inclination of the center of rotation of the shaft.

26. The method of aligning a vertical shaft of claim 25 comprising the step of using a computer to perform the calculations.

27. The method of aligning a vertical shaft of claim 26,
wherein the first set of static inclination readings comprise information from two inclinometers mounted in a first position on a horizontal plane of the shaft and located approximately 90° apart;
wherein the second set of static inclination readings comprise information from the two inclinometers positioned approximately 1800 from the first position and on the horizontal plane;
wherein the first set of rotational inclination readings comprise information from two inclinometers located 90° apart on a horizontal plane and each subsequent set of rotational readings is taken after the shaft is turned approximately 90°.

* * * * *